United States Patent
Kubo

(10) Patent No.: US 10,303,033 B2
(45) Date of Patent: May 28, 2019

(54) ELECTROCHROMIC ELEMENT, OPTICAL FILTER, LENS UNIT, AND IMAGE PICK-UP APPARATUS

(71) Applicant: CANON KABUSHIKI KAISHA, Tokyo (JP)

(72) Inventor: Wataru Kubo, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 97 days.

(21) Appl. No.: 15/432,196

(22) Filed: Feb. 14, 2017

(65) Prior Publication Data
US 2017/0235202 A1  Aug. 17, 2017

(30) Foreign Application Priority Data

Feb. 17, 2016 (JP) .................................. 2016-027751
Jan. 18, 2017 (JP) .................................. 2017-006481

(51) Int. Cl.
*G02F 1/01* (2006.01)
*G02F 1/155* (2006.01)
*G02F 1/15* (2019.01)

(52) U.S. Cl.
CPC ............ *G02F 1/155* (2013.01); *G02F 1/1521* (2013.01)

(58) Field of Classification Search
CPC ................... G02F 1/1521; G02F 1/155; G02F 2001/1552; G02F 2001/1555; G02F 2001/1557
USPC ........................................................ 359/266
See application file for complete search history.

(56) References Cited

U.S. PATENT DOCUMENTS

| 5,608,567 | A  | * | 3/1997 | Grupp .................... A61F 9/067 349/104 |
| 6,020,987 | A  | * | 2/2000 | Baumann .......... B32B 17/10036 359/273 |
| 6,188,505 | B1 |   | 2/2001 | Lomprey |
| 10,018,813 | B2 | * | 7/2018 | Yanai ................... G02B 15/173 |
| 2012/0229917 | A1 | * | 9/2012 | Huang ............... G02B 13/0045 359/713 |
| 2018/0113366 | A1 | * | 4/2018 | Kaneko ............... G02F 1/13439 |

OTHER PUBLICATIONS

Rachel Cinnealach, et al., Coloured electrochromic windows based on nanostructured TiO2 films modifed by adsorbed redox chromophores, Solar Energy Materials and Solar Cells 57 (1999) 107-125.

* cited by examiner

*Primary Examiner* — William R Alexander
*Assistant Examiner* — Henry A Duong
(74) *Attorney, Agent, or Firm* — Canon U.S.A. Inc., IP Division

(57) ABSTRACT

The present invention provides an electrochromic element that includes a first electrode, a second electrode, and a third electrode, wherein at least one of the first electrode and the second electrode is a transparent electrode, and an electrolyte, an anodic organic electrochromic compound, and a cathodic redox substance are present between the first electrode and the second electrode, the third electrode is electrically connectable to the first electrode or the second electrode via the electrolyte, the third electrode contains an irreversibly oxidizable substance, and the oxidizable substance is not oxidized by a first oxidant of the anodic organic electrochromic compound but is more easily oxidizable than a reductant in an irreversible oxidation reaction of the anodic organic electrochromic compound.

18 Claims, 9 Drawing Sheets

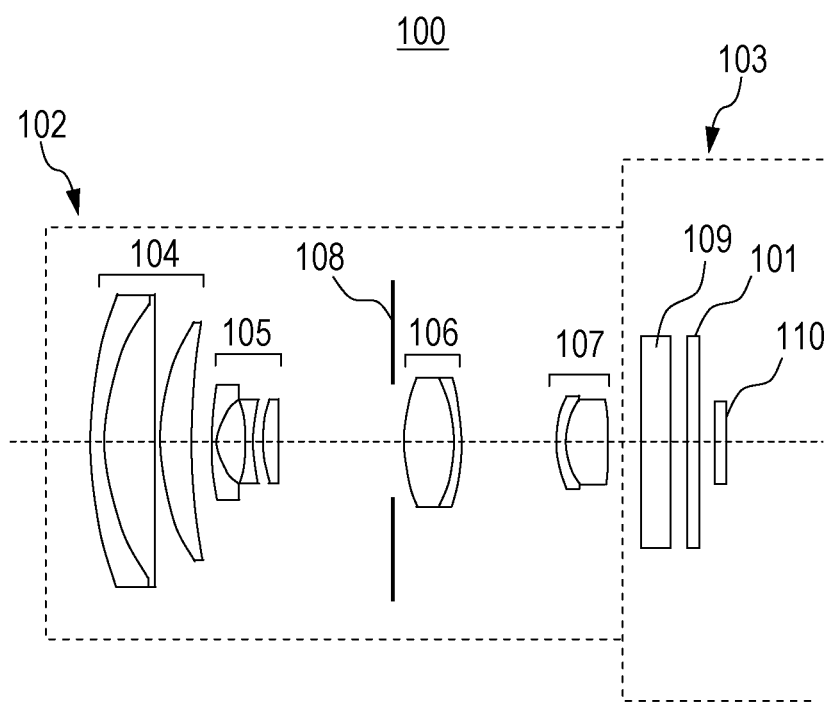

ELECTROCHROMIC ELEMENT, OPTICAL FILTER, LENS UNIT, AND IMAGE PICK-UP APPARATUS

BACKGROUND OF THE INVENTION

Field of the Invention

The present disclosure relates to an electrochromic element and to an optical filter, a lens unit, and an image pick-up apparatus each including the electrochromic element.

Description of the Related Art

EC elements that utilize electrochromic (hereinafter sometimes abbreviated to "EC") materials in which the optical absorption characteristics (absorption wavelength and absorbance) of substances vary through an electrochemical redox reaction have been used in display apparatuses, variable reflectivity mirrors, and variable transmission windows. Among EC materials, organic electrochromic compounds can be designed to have a variable absorption wavelength and can have a high coloring and bleaching contrast. Thus, organic electrochromic compounds are being actively developed.

In such EC elements, one of the greatest problems is to reduce temporal changes in optical characteristics. U.S. Pat. No. 6,188,505 discloses that a non-electrochromic material that is more easily oxidizable than anodic EC materials and a non-electrochromic material that is more easily reducible than cathodic EC materials are used in a complementary EC element, in which an EC material is dissolved in an electrolyte. These materials are hereinafter referred to as "redox buffers".

In an EC element according to U.S. Pat. No. 6,188,505, an oxidant of a redox buffer is more stable than an oxidant of an anodic EC material, which is a colored body, and a reductant of the redox buffer is more stable than a reductant of a cathodic EC material. Thus, during bleaching action, as long as a charge imbalance is compensated for by the charge amount of the redox buffer, the corresponding oxidant or reductant of the redox buffer is generated, rather than colored bodies in EC materials being left. Because the redox buffer is non-electrochromic, even when the oxidant or reductant is generated, the redox reaction does not affect light transmittance. In other words, the redox buffer functions to provide a charge balance region of invariable color. Thus, in the EC element according to U.S. Pat. No. 6,188,505, a charge imbalance does not directly cause poor bleaching.

However, in U.S. Pat. No. 6,188,505, the redox buffer is more easily oxidizable than anodic EC materials or more easily reducible than cathodic EC materials, and is therefore more reactive than the EC materials in terms of electric potential. Thus, in the general coloring action of the EC element, the redox buffer is more (or at least equally) reactive than the EC materials. Unlike in the absence of the redox buffer, this requires unnecessary electric current not contributing to coloring, increases power consumption, and lowers response speed.

Furthermore, the use of a redox buffer, as in U.S. Pat. No. 6,188,505, does not necessarily correct charge imbalance between display electrodes. More specifically, the use of a redox buffer only decreases the amount of colored body of an EC material (instead, generates an oxidant/reductant of the redox buffer not contributing coloring and bleaching) and does not necessarily have an effect on the charge balance between display electrodes. A charge imbalance in a complementary EC element changes the ratio of a colored body of an anodic EC material to a colored body of a cathodic EC material. More specifically, the coloring ratio of a material having opposite polarity with respect to a material remaining due to charge imbalance becomes smaller than the coloring ratio of the material remaining due to charge imbalance. For example, when an EC element in a charge imbalance state in which a colored body of a cathodic EC material remains is colored, the coloring ratio due to an anode material becomes smaller than the coloring ratio due to a cathode material, as compared with a state of no charge imbalance. Consequently, the actual absorption spectrum deviates from the design absorption spectrum and appears undesirably as discoloration of the absorption color of the EC element. In U.S. Pat. No. 6,188,505, during bleaching action due to charge imbalance, a redox buffer receives the charge of a residual oxidant of an anode material or a residual reductant of a cathode material and thereby suppresses residual coloring of the polarity of one of the anode and the cathode. However, this does not correct charge imbalance between display electrodes and therefore does not correct the shift the ratio of a colored body of an anodic EC material to a colored body of a cathodic EC material. In other words, even a charge imbalance between display electrodes only suppresses coloring in bleaching action, and a charge imbalance during coloring action changes the ratio of coloring in an anode material to coloring in a cathode material.

SUMMARY OF THE INVENTION

In order to solve these problems, the present invention provides an electrochromic element that can correct a charge imbalance, reduce poor bleaching (residual coloring), and reproduce a spectrum during coloring action.

An electrochromic element according to a first aspect of the present disclosure includes a first electrode, a second electrode, and a third electrode, wherein at least one of the first electrode and the second electrode is a transparent electrode, and an electrolyte, an anodic organic electrochromic compound, and a cathodic redox substance are present between the first electrode and the second electrode, the third electrode is electrically connectable to the first electrode or the second electrode via the electrolyte, the third electrode contains an irreversibly oxidizable substance, and the oxidizable substance is not oxidized by a first oxidant of the anodic organic electrochromic compound but is more easily oxidizable than a reductant in an irreversible oxidation reaction of the anodic organic electrochromic compound.

Art electrochromic element according to a second aspect of the present disclosure includes a first electrode, a second electrode, and a third electrode, wherein at least one of the first electrode and the second electrode is a transparent electrode, and an electrolyte, a cathodic organic electrochromic compound, and an anodic redox substance are present between the first electrode and the second electrode, the third electrode is electrically connectable to the first electrode or the second electrode via the electrolyte, the third electrode contains an irreversibly reducible substance, and the reducible substance is not reduced by a first reductant of the cathodic organic electrochromic compound but is more easily reducible than an oxidant in an irreversible reduction reaction of the cathodic organic electrochromic compound.

An electrochromic element according to a third aspect of the present disclosure includes a first electrode, a second electrode, and a third electrode, wherein at least one of the first electrode and the second electrode is a transparent electrode, and an electrolyte, an anodic organic electrochromic compound, and a cathodic organic electrochromic compound are present between the first electrode and the second electrode, the third electrode is electrically connectable to the first electrode or the second electrode via the electrolyte, the third electrode contains an irreversibly oxidizable substance and an irreversibly reducible substance, the oxidizable substance not oxidized by a first oxidant of the anodic organic electrochromic compound but is more easily oxidizable than a reductant in an irreversible oxidation reaction of the anodic organic electrochromic compound, and the reducible substance is not reduced by a first reductant of the cathodic organic electrochromic compound but is more easily reducible than an oxidant in an irreversible reduction reaction of the cathodic organic electrochromic compound.

An electrochromic element according to a fourth aspect of the present disclosure includes a first electrode, a second electrode, and a third electrode, wherein at least one of the first electrode and the second electrode is a transparent electrode, and an electrolyte, an anodic organic electrochromic compound, and a cathodic redox substance are present between the first electrode and the second electrode, the third electrode is electrically connectable to the first electrode or the second electrode via the electrolyte, the third electrode contains an irreversibly oxidizable substance, and an oxidation potential C of the oxidizable substance is between an oxidation potential A of a reversible first oxidation reaction of the anodic organic electrochromic compound and an oxidation potential B of an irreversible oxidation reaction of the anodic organic electrochromic compound.

An electrochromic element according to a fifth aspect of the present disclosure includes a first electrode, a second electrode, and a third electrode, wherein at least one of the first electrode and the second electrode is a transparent electrode, and an electrolyte, a cathodic organic electrochromic compound, and an anodic redox substance are present between the first electrode and the second electrode, the third electrode is electrically connectable to the first electrode or the second electrode via the electrolyte, the third electrode contains an irreversibly reducible substance, and a reduction potential F of the reducible substance is between a reduction potential D of a reversible first reduction reaction of the cathodic organic electrochromic compound and a reduction potential E of an irreversible reduction reaction of the anodic organic electrochromic compound.

An electrochromic element according to a sixth aspect of the present disclosure includes a first electrode, a second electrode, and a third electrode, wherein at least one of the first electrode and the second electrode is a transparent electrode, and an electrolyte, an anodic organic electrochromic compound, and a cathodic organic electrochromic compound are present between the first electrode and the second electrode, the third electrode is electrically connectable to the first electrode or the second electrode via the electrolyte, the third electrode contains an irreversibly oxidizable substance and an irreversibly reducible substance, an oxidation potential C of the oxidizable substance is between an oxidation potential A of a reversible first oxidation reaction of the anodic organic electrochromic compound and an oxidation potential B of an irreversible oxidation reaction of the anodic organic electrochromic compound, and a reduction potential F of the reducible substance is between a reduction potential D of a reversible first reduction reaction of the cathodic organic electrochromic compound and a reduction potential E of an irreversible reduction reaction of the anodic organic electrochromic compound.

Further features of the present disclosure will become apparent from the following description of exemplary embodiments with reference to the attached drawings.

BRIEF DESCRIPTION OF THE DRAWINGS

FIG. 6 is a schematic view of an image pick-up apparatus according to an example embodiment.

DESCRIPTION OF THE EMBODIMENTS

Figure 1A:
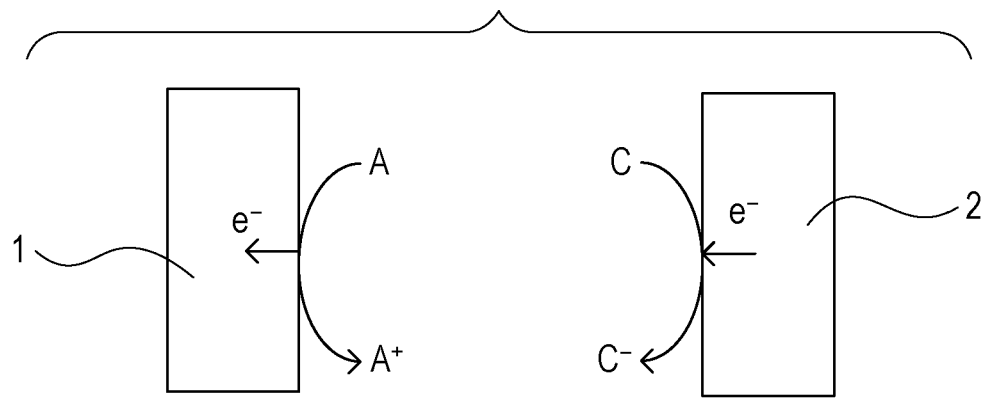
FIGS. 1A to 1C are explanatory views of a charge balance/imbalance concept.

An electrochromic element (EC element) according to the present invention includes a first electrode, a second electrode, and a third electrode. At least one of the first electrode and the second electrode is a transparent electrode. An electrolyte, and an anodic organic electrochromic compound or a cathodic organic electrochromic compound are present between the first electrode and the second electrode. At least two redox substances are present between the first electrode and the second electrode. The term "redox substance", as used herein, also includes an organic electrochromic compound. The two redox substances between the first electrode and the second electrode are more specifically one of the following combinations (i) to (iii):

(i) an anodic organic electrochromic compound and a cathodic redox substance,
(ii) a cathodic organic electrochromic compound and an anodic redox substance, and
(iii) an anodic organic electrochromic compound and a cathodic organic electrochromic compound.

The third electrode can be electrically connected to at least one of the first electrode and the second electrode via an electrolyte. The third electrode contains an oxidizable substance or a reducible substance. The oxidizable substance in the third electrode is an irreversibly oxidizable substance. The reducible substance in the third electrode is an irreversibly reducible substance. In the presence of an anodic organic electrochromic compound (EC material) between the first electrode and the second electrode, the oxidizable substance in the third electrode is not oxidized by a first oxidant of the anodic organic EC compound. The oxidizable substance is more easily oxidizable than a reductant in an irreversible oxidation reaction of the anodic organic electrochromic compound. In the presence of a cathodic organic electrochromic compound (EC material) between the first electrode and the second electrode, the reducible substance in the third electrode is not reduced by a first reductant of the cathodic organic electrochromic compound. The reducible substance is more easily reducible than an oxidant in an irreversible reduction reaction of the cathodic organic EC compound.

At least one of an anodic redox substance and a cathodic redox substance reduces poor coloring and bleaching due to charge imbalance in a complementary EC element containing an EC material. The charge balance/imbalance concept will be described later.

1. Redox Substance

The term "redox substance", as used herein, refers to a compound that can repeatedly undergo a redox reaction in a predetermined electric potential range. Redox substances include inorganic compounds and organic compounds, both of which can be used in the present disclosure without limitation. In particular, considering adaptability to the use environment of an EC material to be used, redox substances can be organic compounds.

In the following description, a redox substance may be referred to as an "anodic redox substance" or a "cathodic redox substance", for example. Anodic redox substances generally refer to substances that are reductants in a state in which the element is not driven but are oxidants in a state in which the element is driven (in particular, colored). Cathodic redox substances generally refer to substances that are oxidants in a state in which the element is not driven but are reductants in a state in which the element is driven (in particular, colored).

2. Organic Electrochromic (EC) Material (Organic Electrochromic Compound)

The term "organic electrochromic (EC) material", as used herein, refers to a substance that is one of redox substances and has optical absorption characteristics variable with a redox reaction in a target optical wavelength region of elements. Organic electrochromic compounds described above are synonymous with organic electrochromic materials. Although electrochromic materials include organic compounds and inorganic compounds, in the following description, an organic electrochromic material is referred to as an "EC material". The term "optical absorption characteristics", as used herein, typically refers to an optical absorption state and an optical transmission state EC materials change between an optical absorption state and an optical transmission state.

In the following description, an EC material may be referred to as an "anodic EC material" or a "cathodic EC material". The term "anodic EC material", as used herein, refers to a material that changes from an optical transmission state to an optical absorption state in a target optical wavelength region of elements through an oxidation reaction in which an electron is removed from the EC material. The term "cathodic EC material", as used herein, refers to a material that changes from an optical transmission state to an optical absorption state in a target optical wavelength region of elements through a reduction reaction in which an electron is donated to the EC material.

3. Oxidant and Reductant

The terms "oxidant" and "reductant" with respect to redox substances and EC materials will be described below. In the following description, the term "oxidant" of redox substances or EC materials refers to a substance that can be reduced to a reductant through a corresponding reversible reduction reaction involving at least one electron on an electrode. The term "reductant" of redox substances or EC materials refers to a substance that can be oxidized to an oxidant through a corresponding reversible oxidation reaction involving at least one electron on an electrode.

In literature, the state of redox substances and EC materials may be represented as being from an oxidant to a reductant (and vice versa) via a neutral. In the following description, however, oxidants and reductants are basically described on the basis of the knowledge that reductants are formed by reduction of oxidants and oxidants are formed by oxidation of reductants. For example, in the case where ferrocene functions as an anodic redox substance, ferrocene having divalent iron (neutral as the whole molecule) is a reductant of ferrocene (an anodic redox substance). Ferrocene having trivalent iron produced by oxidation of the reductant is an oxidant of ferrocene (an anodic redox substance). The oxidant is also referred to as a first oxidant because the oxidant is produced in the first stage of the oxidation reaction of the reductant of ferrocene. In the case where a dication salt of viologen functions as a cathodic EC material, the dication salt is an oxidant of the cathodic EC material. A monocation salt produced by the dication salt receiving one electron is a reductant of the cathodic EC material. The reductant is also referred to as a first reductant because the reductant is produced in the first stage of the reduction reaction of the dication salt (oxidant).

A reversible oxidation (or reduction) reaction of some redox substances and EC materials occurs in multiple stages. In such a case, for example, a substance produced in the first stage of an oxidation (reduction) reaction is a first oxidant (reductant), and a substance produced in the second stage of the oxidation (reduction) reaction is a second oxidant (reductant). Thus, a substance produced in the n-th (n is an integer of at least 1) stage of an oxidation (reduction) reaction is an n-th oxidant (reductant).

4. Electrolyte

An electrolyte is not limited to the electrolyte itself but includes an electrolytic solution prepared by dissolving the electrolyte in a solvent. An electrolyte includes a solution prepared by dissolving a salt compound in a solvent, an ionic liquid, a gel electrolyte, or a polymer electrolyte. Specific examples of such an electrolyte will be described later.

5. Oxidizable Substance and Reducible Substance in Third Electrode

The oxidizable substance in the third electrode is a compound that undergoes an irreversible oxidation reaction in a predetermined electric potential range. The reducible substance in the third electrode is a compound that undergoes an irreversible reduction reaction in a predetermined electric potential range. The oxidizable substance or the reducible substance in the third electrode is directly or indirectly immobilized on the third electrode. The substance directly immobilized on the third electrode is physically or chemically immobilized on the third electrode with no substance interposed therebetween. The substance indirectly immobilized on the third electrode is physical or chemically immobilized on the third electrode, for example, via a film substance. In each case, the substance can donate charge to or receive charge from the third electrode. The third electrode can donate charge to or receive charge from an EC material in the electrolyte and can donate charge to or receive charge from an external circuit.

Oxidizable substances and reducible substances that can be used include inorganic compounds and organic compounds, both of which can be used without limitation. In particular, considering adaptability to the use environment of an EC material to be used, the oxidizable substances and reducible substances can be organic compounds. The term "irreversibly oxidizable", as used herein, means that an oxidant produced by an oxidation reaction of an oxidizable substance is not easily reduced into the oxidizable substance through a reduction reaction. The term "irreversibly reducible", as used herein, means that a reductant produced by a reduction reaction of a reducible substance is not easily oxidized into the reducible substance through an oxidation reaction. The term "not easily" means not easily in comparison with the redox substances described above (substances that can repeatedly undergo a redox reaction in a predetermined electric potential range). More specifically, this means that the number of repetitions of a corresponding redox reaction is 1/10 or less, preferably 1/100 or less, more preferably 1/1000 or less, the number of repetitions of a redox reaction of the redox substances. In an initial state of common EC elements, an oxidizable substance is a reductant and is contained in a third electrode in a state ready to undergo an irreversible oxidation reaction. Likewise, a reducible substance is an oxidant and is contained in a third electrode in a state ready to undergo an irreversible reduction reaction.

6. Charge Balance/Imbalance

Figure 1B:
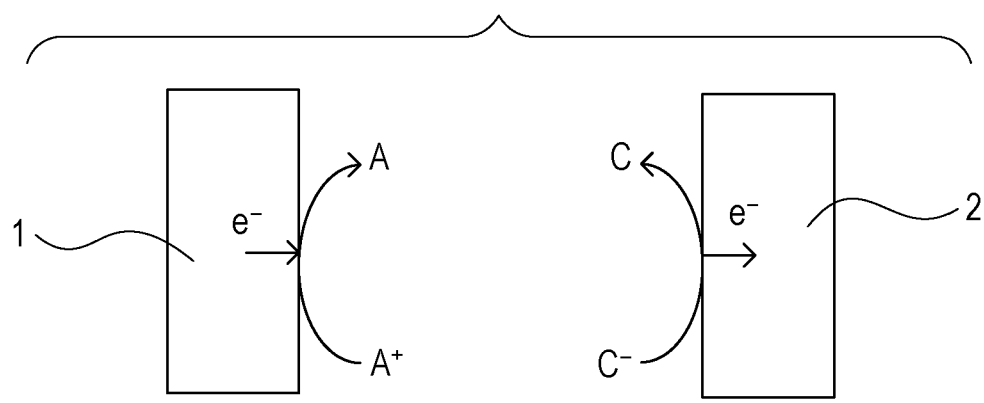
Figure 1C:
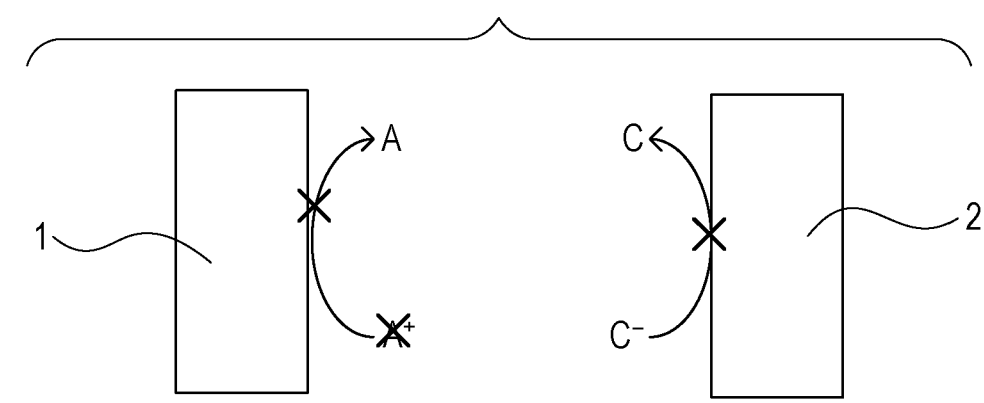

The charge balance/imbalance concept will be described below with reference to the accompanying drawings. FIGS. 1A to 1C are explanatory views of a charge balance/imbalance concept. FIGS. 1A to 1C illustrate a complementary EC element. FIGS. 1A to 1C illustrate a first electrode 1, which is an anode, and a second electrode 2, which is a cathode. In FIGS. 1A to 1C, A denotes a reductant of an anodic EC material (bleached state), and denotes an oxidant of the anodic EC material (colored state). In FIGS. 1A to 1C, C denotes an oxidant of a cathodic EC material (bleached state), and C denotes a reductant of the cathodic EC material (colored state).

FIG. 1A illustrates a coloring process of the EC element. Application of a coloring voltage between the anode (the first electrode 1) and the cathode (the second electrode 2) induces an oxidation reaction of the anodic EC material on the first electrode 1, as illustrated in the following formula (α), and a reduction reaction of the cathodic EC material on the second electrode 2, as illustrated in the following formula (β).

$$A \rightarrow A^+ + e^- \quad (\alpha)$$

$$C + e^- \rightarrow C^- \quad (\beta)$$

Through these reactions, the EC cell unit reaches the colored state.

FIG. 1B illustrates a bleaching process, which is opposite to the coloring process. For bleaching of the EC cell unit, a bleaching voltage (for example, 0 V for a short circuit between the first electrode 1 and the second electrode 2) is applied between the first electrode 1 and the second electrode 2 to induce a reverse reaction of the reaction illustrated in FIG. 1A, as indicated by the arcuate arrows in FIG. 1B. Thus, the anodic EC material has a reduction state A, the cathodic EC material has an oxidation state C, and the EC material in the colored state returns to the bleached state.

When the reactions illustrated in FIGS. 1A and 1B are repeated, the EC element has a normal charge balance and properly performs coloring and bleaching multiple times.

However, while the EC element is driven, the charge balance may be disturbed by a process other than the normal coloring and bleaching process. This can be ascribed to several causes. For example, degradation of the oxidant ($A^+$) of the anodic EC material will be described below with reference to FIG. 1C. When the colored oxidant $A^+$ of the anodic EC material after the normal coloring process deteriorates and cannot undergo the reaction on the first electrode 1, the reductant $C^-$ of the cathodic EC material on the second electrode 2 also loses an electron acceptor and cannot undergo the reaction. In the following description, such a phenomenon is referred to as disruption of charge balance, that is, charge imbalance. A charge imbalance results in poor bleaching of the EC element with a residual colored body $C^-$ of the cathodic EC material, although the cathodic EC material is normal.

Charge imbalance may be caused by an irreversible electron transfer reaction (in particular, an electrode reaction) of a substrate constituting the redox reaction. More specifically, charge imbalance may be caused by a chemical reaction of impurities (impurities originating from EC materials, environmental impurities (such as oxygen and water), and impurities originating from sealants) and radicals. For example, a colored body of an anode material may remain due to an irreversible reduction reaction of oxygen that has entered the system as an impurity, or a colored body of a cathode material may remain due to an irreversible oxidation reaction of a component containing a sealant.

7. EC Element

Figure 2:
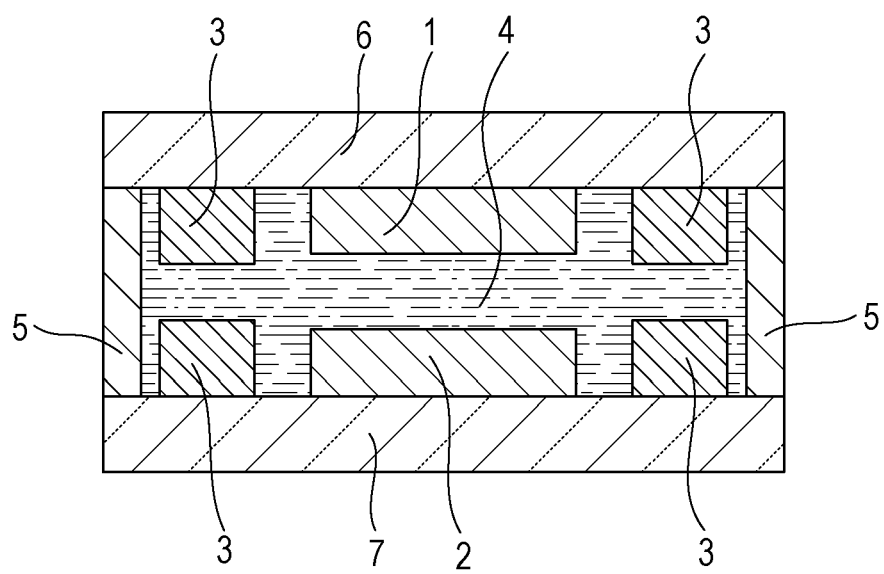
FIG. 2 is a schematic cross-sectional view of an EC element according to an example embodiment.

FIG. 2 is a schematic cross-sectional view of an EC element according to an example embodiment. An EC element 10 illustrated in FIG. 2 includes a first substrate 6 and a second substrate 7. A first electrode 1 and a third electrode 3 are disposed on the first substrate 6. A second electrode 2 and a third electrode 3 are disposed on the second substrate 7. In the EC element 10 illustrated in FIG. 2, an electrolyte 4 is present between the first electrode 1 and the second electrode 2. The electrolyte 4 is in contact with the first electrode 1, the second electrode 2, and the third electrodes 3. The electrolyte 4 is isolated from the outside by a sealant 5. The EC element 10 contains an anodic redox substance and a cathodic redox substance between the first electrode 1 and the second electrode 2. The anodic redox substance and the cathodic redox substance between the first electrode 1 and the second electrode 2 may be dissolved in the electrolyte 4 or may be immobilized on the first electrode 1 or the second electrode 2. At least one of the anodic redox substance and the cathodic redox substance between the first electrode 1 and the second electrode 2 is an EC material.

The constitution elements of the electrochromic element 10 according to the present embodiment will be described below.

(1) Substrate

The substrate (6, 7) of the EC element 10 may be a transparent substrate, such as a glass substrate or a polymer substrate.

(2) First Electrode and Second Electrode

At least one of the first electrode 1 and the second electrode 2 is a transparent electrode. The term "transparent", as used herein, means that the electrode can transmit light and preferably has a light transmittance of 50% or more and 100% or less. In the case where at least one of the first electrode 1 and the second electrode 2 is a transparent electrode, the EC element 10 can efficiently transmit light from the outside and allows the light to interact with molecules of the EC material, thereby allowing the optical characteristics of the molecules of the EC material to be reflected in output light. The term "light", as used herein, refers to light in a certain wavelength region, and the "wavelength region" depends on the use of the EC element 10. For example, when the EC element 10 is used as a filter for an image pick-up apparatus in a visible light region, the light is in the visible light region. When the EC element 10 is used as a filter for an image pick-up apparatus in an infrared region, the light is in the infrared region.

The transparent electrode may be a thin film, serving as an electroconductive layer, containing a transparent conductive oxide or dispersed carbon nanotubes disposed on the substrate (6, 7) or a transparent, electrode that includes a metal wire, a transparent substrate, or a combination thereof, that is, a metal wire partly disposed on a transparent substrate (6, 7).

Examples of the transparent conductive oxide include, but are not limited to, tin-doped indium oxide (ITO), zinc oxide, gallium-doped zinc oxide (GZO), aluminum-doped zinc oxide (AZO), tin oxide, antimony-doped tin oxide (ATO), fluorine-doped tin oxide (FTO), and niobium-doped titanium oxide (TNO). Among these, FTO has high heat resistance (from the perspective of applicability in a firing treatment step of forming a porous electrode), high reduction resistant, and high electrical conductivity, and ITO has high electrical conductivity and transparency. An electrode formed of a transparent conductive oxide preferably has a thickness in the range of 10 to 10000 nm. In particular, a transparent conductive oxide layer formed of FTO or ITO having a thickness in the range of 10 to 10000 nm can be used. Such a transparent conductive oxide layer has high permeability and chemical stability.

The transparent conductive oxide layer may be composed of transparent conductive oxide sublayers. Such a transparent conductive oxide layer can easily have high electrical conductivity and transparency.

A metal wire disposed on the substrate (6, 7) is not particularly limited and may be an electrochemically stable metallic material wire, such as a Ag, Au, Pt, or Ti wire. The metal wire can have a grid pattern. An electrode including a metal wire is typically a plane electrode and may be a curved electrode, if necessary.

Among the first electrode 1 and the second electrode 2, an electrode other than the transparent electrode is selected according to the intended use of the EC element. For example, in the case where the EC element 10 illustrated in FIG. 2 is a transmissive EC element, both the first electrode 1 and the second electrode 2 can be a transparent electrode. In the case where the EC element 10 illustrated in FIG. 2 is a reflective EC element, one of the first electrode 1 and the second electrode 2 is a transparent electrode, and the other is an electrode that reflects incident light. A reflective layer or scattering layer between the electrodes can improve the flexibility of the optical characteristics of an electrode other than the transparent electrode. For example, when a reflective layer or scattering layer is disposed between the electrodes, an electrode behind the reflective layer or scattering layer can be an opaque electrode or a light-absorbing electrode without affecting output light.

Irrespective of the type of an EC element, the constituent materials of the first electrode 1 and the second electrode 2 can be stable in the operating environment of the EC element and rapidly undergo a redox reaction upon application of a voltage from the outside.

The distance (interelectrode distance) between the first electrode 1 and the second electrode 2 is preferably 1 µm or more and 500 µm or less. At a large interelectrode distance, a sufficient amount of EC material can be present to function effectively as an EC element. At a short interelectrode distance, a high response speed can be achieved.

(3) Third Electrode

An EC element includes a third electrode 3 in addition to the first electrode 1 and the second electrode 2. As described in "6. Charge Balance/Imbalance", in a complementary EC element that contains both an anodic redox substance and a cathodic redox substance, one of which is an EC material, charge imbalance, whether anodic or cathodic, can be perceived as poor bleaching. In such a case, despite trying to reduce poor bleaching (unbleaching) by changing a voltage applied between the first electrode 1 and the second electrode 2 to a voltage having polarity opposite to polarity in coloring, this only results in coloring of an EC material having opposite polarity or in a reaction of a redox substance having opposite polarity thus resulting in an ineffective measure. The term "EC material having opposite polarity", as used herein, refers to a cathodic EC material when an anodic EC material is unbleached or an anodic EC material when a cathodic EC material is unbleached. The term "redox substance having opposite polarity", as used herein, refers to a cathodic EC redox substance when an anodic EC material is unbleached or an anodic redox substance when a cathodic EC material is unbleached.

Thus, the third electrode 3 containing an oxidizable substance or a reducible substance is used to adjust the charge balance with the polarity and amount of charge used in a redox reaction between the third electrode 3 and the first electrode 1 or the second electrode 2. Such adjustment of the amount of charge with polarity is referred to as adjustment of charge balance, that is, charge rebalance.

The third electrode 3 is an electrode that contains a substance required for charge rebalance, more specifically, at least one of an oxidizable substance and a reducible substance. A substance (an oxidizable substance and/or a reducible substance) in the third electrode 3 may be any inorganic or organic compound that can be irreversibly oxidized or reduced in a desired electric potential range. In particular, considering adaptability to the use environment of an EC material to be used in combination, an organic compound can be used. The third electrode 3 can contain one substance or at least two substances. The third electrode 3 may contain both an oxidizable substance and a reducible substance.

A substance (an oxidizable substance and/or a reducible substance) in the third electrode 3 may be a substance that produces a color before or after a reaction or a substance that does not produce a color before or after a reaction. If the third electrode 3 is disposed on the optical path of light incident on the EC element 10, a non-coloring substance can be used to reduce the effect of light absorption of an oxidizable substance or a reducible substance. If the third electrode 3 is disposed outside the optical path of light incident on the EC element 10, a substance that changes the degree of coloring or color through a reaction can be used to determine the degree of charge rebalance according to the degree of coloring.

The third electrode 3 may contain any substance, typically an organic compound. In particular, an organic compound containing nitrogen, sulfur, and/or oxygen can be used as art organic compound that can undergo an oxidation reaction or a reduction reaction. Typical examples of such a nitrogen-containing compound include, but are not limited to, amine compounds, and typical examples of such a sulfur-containing compound include, but are not limited to, thiophene compounds. Such amine compounds may be used as oxidizable substances or reducible substances. More specifically, such amine compounds may be primary amine compounds, secondary amine compounds, tertiary amine compounds, and aromatic amine compounds. Such thiophene compounds may be used as oxidizable substances. A specific method for immobilizing an oxidizable substance or a reducible substance on the third electrode 3 may be a method for bonding an oxidizable substance or a reducible substance to an electrode material via a functional group of the substance, a method for holding an oxidizable substance or a reducible substance integrally (for example, in a film state) by utilizing force such as electrostatic interaction, or a method for physically adsorbing an oxidizable substance or a reducible substance on an electrode. In particular, in order to achieve rapid response of a substance to be used, a method for chemically bonding the substance to a porous electrode via a functional group of the substance or a method for forming a compound having an irreversible oxidation or reduction site on an electrode may be employed. The former method can be used when a substance in the third electrode 3 is a low-molecular-weight organic compound. A specific example of the former method may be a method for immobilizing a low-molecular-weight organic compound on an oxide fine particle electrode, such as titanium oxide, zinc oxide, or tin oxide, via a functional group, such as an acid group (for example, a phosphoric group, a carboxy group, a hydroxy group, or a thiol group). The latter method can be used when a substance in the third electrode 3 is a polymer. A specific example of the latter method may be a method for forming a target polymer on an electrode by polymerization.

The relationship between a substance (an oxidizable substance and/or a reducible substance) in the third electrode 3 and an EC material between the first electrode 1 and the second electrode 2 will be described below. In the presence of an anodic EC material, the third electrode 3 contains an oxidizable substance. The oxidizable substance is not oxidized by a first oxidant of an anodic organic EC compound (EC material) but is more easily oxidizable than a reductant in an irreversible oxidation reaction of the anodic organic EC compound. In the presence of a cathodic EC material, the third electrode 3 contains a reducible substance. The reducible substance is not reduced by a first reductant of a cathodic organic EC compound (EC material) but is more easily reducible than an oxidant in an irreversible reduction reaction of the cathodic organic EC compound. The reasons for these relationships of the oxidizable substance and the reducible substance will be described below.

In general, a first oxidant of an anodic organic EC compound is a substance that is used as a colored body of the anodic organic EC compound to color an EC element. When an oxidizable substance in an EC element is oxidized by a first oxidant of the anodic organic EC compound, this means that the oxidizable substance is oxidized by a colored body of the anodic organic EC compound produced by driving the EC element. This reaction changes the charge balance without the intention of a charge rebalance. This undesirably causes charge imbalance or consumes an oxidizable substance that can be used for charge rebalance.

An oxidizable substance is more easily oxidizable than a reductant in an irreversible oxidation reaction of an anodic organic EC compound. The phrase "a reductant in an irreversible oxidation reaction" refers to a state of an anodic organic EC compound that can be reached by a reversible oxidation reaction and in which further oxidization makes a reversible redox reaction difficult.

When an oxidizable substance in an EC element is less oxidizable than the "reductant in an irreversible oxidation reaction", oxidation of the oxidizable substance for charge rebalance can preferentially cause an irreversible oxidation reaction of an anodic organic EC compound. This can undesirably result in poor coloring due to a decrease in the number of molecules of the organic EC compound to be used for coloring of the EC element or poor bleaching due to a colored body produced by an irreversible reaction of the molecules.

As a specific example, an anodic organic EC compound 5,10-dialkyl-5,10-dihydrophenazine in the neutral state is oxidized by one electron to form a monocation as a first oxidant and is further oxidized by another electron to form a dication as a second oxidant. The reactions from which these oxidants are produced are reversible oxidation reactions (the situation may be different under different reaction conditions, including the solvent and electrodes). However, it is difficult to reduce a third oxidant, which is produced by further one-electron oxidation of the second oxidant, into the second oxidant or the first oxidant. Thus, the oxidation reaction from which the third oxidant is produced is an irreversible oxidation reaction for the anodic organic EC compound 5,10-dialkyl-5,10-dihydrophenazine. Thus, a "reductant in an irreversible oxidation reaction" of 5,10-dialkyl-5,10-dihydrophenazine is the second oxidant. For some organic EC, compounds, a one-electron oxidation reaction of a first oxidant may be the "irreversible oxidation reaction". In such a case, the "reductant in an irreversible oxidation reaction" is the first oxidant.

When the charge balance shifts toward the cathode (a cathodic EC material remains colored even in a normal bleached state of an EC element), an electron is removed from the cathodic EC material for charge rebalance. In this case, a reducible substance in the third electrode is used for charge rebalance. The reducible substance is a compound having polarity opposite to the polarity of the oxidizable substance. The reducible substance is an irreversibly reducible substance. A reducible substance is not reduced by a first reductant of a cathodic organic EC compound but is more easily reducible than an oxidant in an irreversible reduction reaction of the cathodic organic EC compound.

In the same manner as in a first oxidant of an anodic organic EC compound, a first reductant of a cathodic organic EC compound is generally a colored body of the organic EC compound and is used to color the EC element. Since a reducible substance is not reduced by a first reductant of a cathodic organic EC compound, for example, the reducible substance is not reduced by a colored body of the cathodic organic EC compound when the EC element is driven. This can prevent charge imbalance due to a reaction that changes the charge balance without the intention of a charge rebalance and can suppress a decrease in the amount of reducible substance to be used for charge rebalance.

The phrase "an oxidant in an irreversible reduction reaction of the cathodic organic EC compound" refers to a state of the cathodic organic EC compound that can be reached by a reversible reduction reaction and in which further reduction makes a reversible redox reaction difficult.

When a reducible substance in an EC element less reducible than the "oxidant in an irreversible reduction reaction", reduction of the reducible substance for charge rebalance can preferentially cause an irreversible reduction reaction of a cathodic organic EC compound. This can undesirably result in poor coloring due to a decrease in the number of molecules of the organic EC compound to be used for coloring of the EC element or poor bleaching due to a colored body produced by an irreversible reaction of the molecules.

As a specific example, a dialkyl viologen compound in a dication state is reduced by one electron to form a monocation as a first reductant and is further reduced by another electron to form a neutral compound as a second reductant. The reactions from which these reductants are produced are basically reversible reduction reactions (the situation may be different under different reaction conditions, including the solvent and electrodes). However, it is difficult to oxidize a third reductant, which is produced by further one-electron reduction of the second reductant, into the second reductant or the first reductant. Thus, the reduction reaction from which the third reductant is produced is an irreversible reduction reaction for the dialkyl viologen compound, which is a cathodic organic EC compound. Thus, the "oxidant in an irreversible reduction reaction" for the dialkyl viologen compound is the second reductant. For some organic EC compounds, a one-electron reduction reaction of a first reductant may be the "irreversible reduction reaction". In such a case, the "oxidant in an irreversible reduction reaction" is the first reductant.

An oxidizable substance and a reducible substance are not dissolved in an electrolyte (are not present together with an electrolyte between a first electrode and a second electrode) but is contained in (immobilized on) a third electrode of an EC element. This produces the following effects. Because the oxidizable substance or the reducible substance is contained in (immobilized on) the third electrode, in general, the oxidizable substance or the reducible substance does not reach an electrode on which an electrochemical reaction of an EC material proceeds (the first electrode and/or the second electrode) when the EC element is driven. Thus, the oxidizable substance and the reducible substance do not consume charge to be used for a reaction of an EC material. This can prevent a decreased coloring and bleaching contrast of the EC element, an increased charge amount (electric power) required for driving, and a decreased response speed of the EC element. The oxidizable substance and the reducible substance may include a material that absorbs light in a corresponding wavelength region. A substance that absorbs light in a particular wavelength region and produces a color (an oxidizable substance or a reducible substance) dissolved in an electrolyte absorbs at least part of light incident on the EC element. This undesirably affects the color and permeability of the EC element. This can be avoided by placing the third electrode containing an oxidizable substance or a reducible substance outside the optical path of light transmitted through the EC element.

A method for determining that (3-1) an oxidizable substance is not oxidized by a first oxidant of an anodic organic EC compound or (3-2) a reducible substance is not reduced by a first reductant of a cathodic organic EC compound will be described below.

(3a) Direct Electron Transfer Reaction Method

In the following method, a first oxidant of an anodic EC material or a first reductant of a cathodic EC material is brought into direct contact with a corresponding oxidizable substance or reducible substance. More specifically, the corresponding oxidizable substance or reducible substance is added to an electrolyte in which the first oxidant of the anodic EC material or the first reductant of the cathodic EC material is dissolved. The oxidizable substance is added to an electrolyte containing the anodic EC material, and the reducible substance is added to an electrolyte containing the cathodic EC material. After the oxidizable substance (or the reducible substance) is added, (3-1) or (3-2) can be confirmed by retention of the colored state of the colored body, that is, the first oxidant of the anodic EC material (or the first reductant of the cathodic EC material).

(3b) Electron Transfer Reaction Method (Direct Method or Method Via Third Electrode)

In the following method, an electrolyte containing a first oxidant of an anodic EC material (or a first reductant of a cathodic EC material) is brought into contact with a third electrode containing a corresponding oxidizable substance (or reducible substance). More specifically, an electrolyte in which the first oxidant of the anodic EC material (or the first reductant of the cathodic EC material) is dissolved is brought into contact with the third electrode containing a corresponding oxidizable substance (or reducible substance). After that, (3-1) or (3-2) can be confirmed by retention of the colored state of the colored body, that is, the oxidant of the anodic EC material (or the reductant of the cathodic EC material).

(3c) Redox Potential Measurement Method

The following method involves comparison of the electrode reaction potential of an EC material or an oxidizable substance (or a reducible substance). The redox potential can be determined by electrochemical measurement. For example, the redox potential can be determined by cyclic voltammogram measurement of the EC material and the oxidizable substance (or reducible substance).

In the cyclic voltammogram measurement, (3-1) can be confirmed by the electric potential of an oxidation reaction (irreversible reaction) of an oxidizable substance in the third electrode higher than the half-wave potential of a redox reaction corresponding to a first oxidation reaction of an anodic EC material. Likewise, (3-2) can be confirmed by the electric potential of a reduction reaction (irreversible reaction) of a reducible substance in the third electrode lower than the half-wave potential of a redox reaction corresponding to a first reduction reaction of a cathodic EC material.

The fact that (3-3) an oxidizable substance is more easily oxidizable than a reductant in an irreversible oxidation reaction of an anodic organic EC compound can be determined by the following method. This method can also be applied to determine that (3-4) a reducible substance is more easily reducible than an oxidant in an irreversible reduction reaction of the cathodic organic EC compound.

(3d) Method Involving Comparison of Redox Reaction Potential

The following method involves comparison of the initial potential of an electrode reaction of an EC material or an oxidizable substance (or a reducible substance). The initial potential can be determined by electrochemical measurement. Examples of the electrochemical measurement include, but are not limited to, cyclic voltammogram measurement of an EC material with a third electrode and cyclic voltammogram measurement of each of an EC material and an oxidizable substance (or reducible substance).

As a result of the cyclic voltammogram measurement of the EC material with the third electrode, (3-3) can be confirmed by the fact that an irreversible oxidation reaction of an oxidizable substance in the third electrode proceeds at a lower electric potential than an irreversible oxidation reaction of an anodic organic EC compound. Likewise, (3-4) can be confirmed by the fact that an irreversible reduction reaction of a reducible substance in the third electrode proceeds at a higher electric potential than an irreversible reduction reaction of a cathodic organic EC compound.

As a result of the cyclic voltammogram measurement of each of the EC material and the oxidizable substance (or reducible substance), (3-3) can be confirmed by the fact that an oxidation reaction or the oxidizable substance proceeds at a lower electric potential than an irreversible oxidation reaction of an anodic organic EC compound. Likewise, (3-4) can be confirmed by the fact that a reduction reaction of a reducible substance proceeds at a higher electric potential than an irreversible reduction reaction of a cathodic organic EC compound.

Requirements of an oxidation reaction of an oxidizable substance or a reduction reaction of a reducible substance in terms of electric potential will be described below.

The oxidation potential C of an oxidizable substance is between the oxidation potential A of a reversible first oxidation reaction of an anodic organic EC compound and the oxidation potential B of an irreversible oxidation reaction of the anodic organic EC compound. The reduction potential F of a reducible substance is between the reduction potential D of a reversible first reduction reaction of a cathodic organic EC compound and the reduction potential E of an irreversible reduction reaction of an anodic organic EC compound.

The following are the reasons for the above settings of the oxidation potential of an oxidizable substance and the reduction potential of a reducible substance.

First, the settings are made with the aim of eliminating the possibility of charge imbalance due to a reaction that changes the charge balance without the intention of a charge rebalance or the possibility of consuming the amount of substance available for charge balance. Second, the settings are made with the aim of preventing an irreversible redox reaction of an organic EC compound from occurring preferentially over a redox reaction of an oxidizable substance (or a reducible substance) for the purpose of charge rebalance.

Electrodes for use in cyclic voltammogram measurement will be described below. An electrode for use in EC elements can be used as a working electrode. For example, an ITO electrode of EC elements can be used as a working electrode. A platinum electrode having a sufficient area can be used as a counter electrode. A third electrode of an EC element can be directly used as a measuring electrode. A solvent for use in EC elements can be used as a solvent or a supporting electrolyte for use in cyclic voltammogram measurement. The sweep rate in voltammogram can range from 20 to 200 mV/s.

In an EC element, the possible charge rebalance range is proportional to the amount of oxidizable substance (or reducible substance) in the third electrode. In other words, the possible charge rebalance range increases with the amount of substance (oxidizable substance or reducible substance) in the third electrode. Thus, basically, the amount of substance (oxidizable substance or reducible substance) in the third electrode can be increased as long as the EC element has no practical difficulty. An effective technique of increasing the amount of substance (oxidizable substance or reducible substance) immobilized on (contained in) the third electrode may be a technique of increasing the surface area of the third electrode. In order to increase the surface area of the third electrode within the element size suitable for actual constitution, the third electrode can have a porous structure. For example, the porous structure has an effective area (roughness factor) 10 or more, preferably 100 or more, times the projected area.

The constituent material of the third electrode is not particularly limited. For the third electrode having a porous structure, the electrode material may be a conductive oxide, such as tin-doped indium oxide (ITO), zinc oxide, gallium-doped zinc oxide (GZO), aluminum-doped zinc oxide (AZO), tin oxide, antimony/doped tin oxide (ATO), fluorine-doped tin oxide (FTO), niobium-doped titanium oxide (TNO), titanium oxide, a porous carbon material, or porous metal. A film composed of at least two of these electrode materials may also be used. When the third electrode is disposed outside the optical path of light incident on the EC element, in addition to the electrode formed of the conductive oxide, a conductive electrode that can scatter light or an electrode formed of an opaque porous conductor, a carbon material, or a metallic material, such as platinum or titanium, may also be used. The porous structure of the third electrode can have a large effective area with a small projected area and have a nanometer-scale fine structure from the perspective of manufacture. The porous structure may have any shape, may be manufactured by any method, and may be a nano-structure, such as a nano-particle film, nanorod, nanowire, or nanotube, having communicating holes. In particular, a particle film having a large specific surface area per volume and easy to manufacture can be suitably used. Particles to form a particle film preferably have an average particle size of 300 nm or less, more preferably 50 nm or less.

The third electrode 3 preferably has a thickness of 100 run or more, more preferably 1 µm or more.

Arrangement of the three electrodes (the first electrode 1, the second electrode 2, and the third electrode 3) will be described below. The first electrode 1 and the second electrode 2 of the three electrodes of an EC element are arranged in a generally known electrode arrangement of EC elements. In a typical example, the first electrode 1 disposed on the substrate 6 and the second electrode 2 disposed on the substrate 7 face each other with an interelectrode distance in the range of approximately 1 to 500 µm. Arrangement of the third electrode 3 will be described later.

A specific method for introducing light into an EC element depends on the use of the EC element. A typical example will be described below. In a transmissive EC element in which the first electrode 1 and the second electrode 2 face each other, incident light is transmitted through the first electrode 1 or the second electrode 2. When an EC material in the EC element is in a colored state, at least part of light transmitted through the first electrode 1 or the second electrode 2 is absorbed into the EC material, and light not absorbed into the EC material is transmitted through and emitted from the other electrode. In a reflective EC element in which the first electrode 1 and the second electrode 2 face each other, incident light is transmitted through a light-transmitting electrode of the first electrode 1 and the second electrode 2. When an EC material in the EC element is in a colored state, after at least part of light transmitted through the electrode is absorbed into the EC material, light not absorbed into the EC material is reflected from a reflector or a scatterer and is transmitted through and emitted from the electrode through which the incident light has been transmitted. Although the reflector or the scatterer is often disposed between the first electrode 1 and the second electrode 2, the reflector or the scatterer may be disposed outside the counter electrode facing the electrode that light, is incident on and transmitted through.

One of major advantages of EC elements is higher maximum permeability than liquid crystal elements of widely distributed light-absorbing devices. In order to make the most of the high permeability, it is desirable to minimize factors that reduce permeability in a wavelength region other than absorption of an EC material in a colored state on an optical path through which light incident on an EC cell unit of an EC element is emitted from the cell unit. If the third electrode 3 of an EC element is disposed on the optical path, the third electrode 3 can also be a factor that reduces the permeability of the EC element. This will be more specifically described below. The third electrode 3 has a larger effective area than the first electrode 1 and the second electrode 2. In order to achieve the large effective area with a small projected area, at least part of the third electrode 3 can have a porous structure. However, if a constituent material of the electrode having the porous structure has low bulk permeability (to visible light), such as a metal or carbon, the third electrode 3 can significantly reduce the permeability of the EC element. Even with a material having high bulk permeability, a large refractive index difference between the material and the electrolyte can reduce the permeability of the EC element due to scattering, for example. Thus, the third electrode 3 can be disposed outside the optical path of light transmitted through at least one of the first electrode 1 and the second electrode 2. From the perspective described above, the phrase "outside the optical path" means outside the optical path of light required to use an EC element as a light-absorbing element. For example, when an EC element is used as a transmissive filter in an image pick-up apparatus, the phrase is applied to the optical path of part of light transmitted through the EC element and reaching part of the area of a light-receiving element (for example, a charge-coupled device (COD) sensor or a complementary metal-oxide semiconductor (CMOS) sensor) required to take an image. Conversely, in the same case, the optical path of part of light transmitted through the EC element and reaching the outside of the area of the light-receiving element required to take an image corresponds to the "outside the optical path". The third electrode 3 outside the optical path can have a high degree of freedom in the selection of the constituent material of the third electrode 3. An oxidizable substance (or reducible substance) having EC characteristics can be used in the third electrode 3 without problems.

Figure 3A:
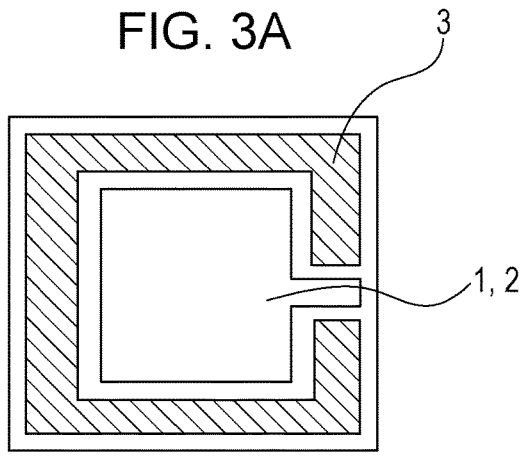
FIGS. 3A to 3B are schematic top views of an EC element.
Figure 3B:
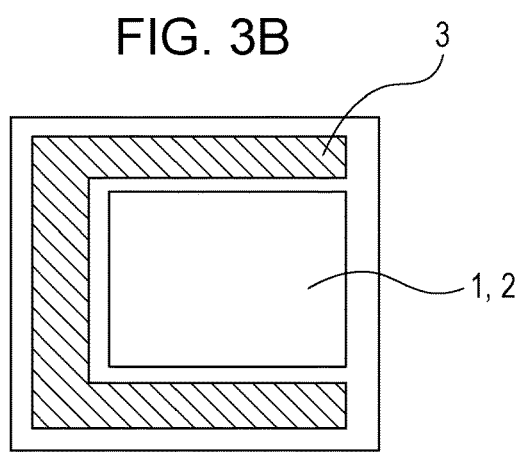
Figure 3C:
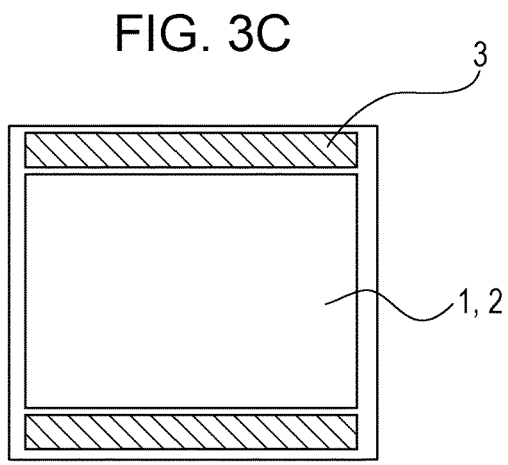

Arrangement of the third electrode 3 in an EC element will be described below. FIGS. 3A to 3C are schematic top views of an EC element. In order to decrease the amount of residual colored body of the EC material on the first electrode 1 and/or the second electrode 2 so as to reduce poor bleaching, it is desirable that a bleaching reaction of the colored body proceed uniformly on the electrode. Thus, the third electrode 3 can be at least partly disposed around the first electrode 1 and/or the second electrode 2, as illustrated in FIGS. 3A to 3C. In FIGS. 3A to 3C, the first electrode 1 and the second electrode 2 overlap. The third electrode 3 may almost entirely surround the first electrode 1 or the second electrode 2, as illustrated in FIG. 3A, or may be disposed on three sides of the first electrode 1 or the second electrode 2, as illustrated in FIG. 3B. Alternatively, as illustrated in FIG. 3C, the third electrode 3 may be disposed on two sides of the first electrode 1 or the second electrode 2. As illustrated in FIG. 3C, the third electrode 3 may include two or more electrodes.

The third electrode 3 can be formed through the following steps.
(A) A step of partly processing, for example, by etching, an electroconductive substrate including an electroconductive film forming the first electrode 1 or the second electrode 2 to divide the electroconductive film into a plurality of regions including a region electrically independent of the first electrode 1 or the second electrode 2.
(B) A step of forming the porous third electrode 3 in an electroconductive film formed in the electrically independent region.
(C) A step of immobilizing an oxidizable substance or a reducible substance on the third electrode 3.

These steps (A), (B), and (C) can be performed any order. The third electrode 3 may be disposed on a substrate on which the first electrode 1 or the second electrode 2 is disposed or may be disposed on both the substrate 6 on which the first electrode 1 is disposed and the substrate 7 on which the second electrode 2 is disposed. The third electrode 3 is electrically independent of the first electrode 1 and the second electrode 2.

(4) Sealant

The substrates 6 and 7 of the EC element 10 illustrated in FIG. 2 are joined together with the sealant 5 while the electrode surface of the first electrode 1 faces the electrode surface of the second electrode 2. The sealant 5 can have stable characteristics against the electrolyte 4 after sealing, can be electrochemically stable and cause no electrochemical reaction when the EC element is driven, can be highly impermeable to gases and liquids, and does not inhibit a redox reaction of the EC material. For example, inorganic materials, such as a glass frit, organic materials, such as epoxy and acrylic resins, and metals may be used. If the sealant 5 has unstable characteristics against the electrolyte 4 after sealing, electrodes may be contaminated with eluted sealant. An electrochemically unstable component of the sealant 5 may cause a charge imbalance due to an electrode reaction if the sealant 5 is permeable to gases and liquids (in particular, oxygen and water), an electrode reaction thereof may cause a charge imbalance. The sealant 5 may contain a spacer material to maintain a constant distance between the first electrode 1 and the second electrode 2. If the sealant cannot define the distance between the first electrode 1 and the second electrode 2, a spacer may separately be used to maintain the distance between the electrodes. The material of the spacer may be an inorganic material, such as silica beads or glass fiber, or an organic material, such as polyimide, polytetrafluoroethylene, polydivinylbenzene, fluororubber, or epoxy resin. The spacer can define and maintain the distance between the first electrode 1 and the second electrode 2 of the EC element 10.

(5) Electrolyte

The EC element 10 contains an electrolyte and an anodic EC material and/or a cathodic EC material between the first electrode 1 and the second electrode 2. The EC materials (the anodic EC material and the cathodic EC material) in the EC element may be dissolved in the electrolyte or may be immobilized on the first electrode 1 or the second electrode 2. An anodic organic EC material and a cathodic organic EC material dissolved in art electrolyte are more advantageous than those immobilized on electrodes with respect to the following two points.

(A) Without the limiting factor in terms of the surface area of an electrode on which the EC material is immobilized, the amount of EC material in the electrolyte can be increased.
(B) Structural refinement and the preparation process often required for both an EC material to be immobilized and an electrode serving as an immobilization support can be eliminated. An anodic organic EC material and a cathodic organic EC material immobilized on an electrode are more advantageous than those dissolved in an electrolyte with respect to the following point. Because the EC material is immobilized on the electrode, (C) there is no decrease in response speed due to substance transport of the EC material to the electrode.

Art electrolyte for use in an EC element may be a salt compound dissolved in a solvent or may be an ionic liquid in which a salt compound itself serves as a solvent.

A solvent of an electrolyte is selected according to the intended use in consideration of the solubility of a solute, including molecules of an EC material, vapor pressure, viscosity, and potential window, and can be a polar solvent. Specific examples of the solvent include, but are not limited to, organic polar solvents, such as methanol, ethanol, propylene carbonate, ethylene carbonate, dimethyl sulfoxy, dimethoxyethane, γ-butyrolactone, γ-valerolactone, sulfolane, dimethylformamide, dimethoxyethane, tetrahydrofuran, acetonitrile, propionitrile, benzonitrile, dimethylacetamide, methylpyrrolidinone, and dioxolane, water, and mixtures thereof. In particular, the solvent can be a cyclic ester compound or a nitrile compound, for example, propylene carbonate.

The solvent may be mixed with a polymer or a gelling agent to have high viscosity or to produce a gel. Examples of the polymer include, but are not limited to, polyacrylonitrile, carboxymethylcellulose, poly(vinyl chloride), poly(ethylene oxide), poly(propylene oxide), polyurethane, polyacrylate, polymethacrylate, polyamide, polyacrylamide, polyester, Nafion (trade name), and saccharides. The polymer and the gelling agent can have a functional group to improve their characteristics. Specific examples of the functional group include, but are not limited to, a cyano group, a hydroxy group, an ester group, an ether group, an amide group, an amino group, a carboxy group, and a sulfonate group.

The electrolyte may contain any ionic dissociative salt compound that has high solubility in solvent, has high compatibility in the case of a solid electrolyte, and is stable at the action potential of the EC element. Various cations and anions may be appropriately used in combination. Examples of the cations include, but are not limited to, metal ions, such as alkali metal ions and alkaline-earth metal ions, and organic ions, such as a quaternary ammonium ion. Specific examples of the cations include, but are not limited to, Li, Na, K, Ca, Ba, tetramethylammonium, tetraethylammonium, and tetrabutylammonium ions. Examples of the anions include, but are not limited to, anions of various fluorine compounds and halide ions. Specific examples of the anions include, but are not limited to, $ClO_4^-$, $SCN^-$, $BF_4^-$, $AsF_6^-$, $CF_3SO_3^-$, $CF_3SO_2NSO_2CF_3^-$, $PF_6^-$, $I^-$, $Br^-$, and $Cl^-$. An EC material also serving as a salt compound can be used as both a solution in which the EC material is dissolved and an electrolyte solution. Examples of the EC material also serving as a salt compound include, but are not limited to, viologen derivative salts.

In the fabrication of an EC element, when an electrolyte is introduced into the EC element, for example, an opening is formed in part of opposite electrodes or sealants, substrates are joined together, and the electrolyte is injected into the resulting cell unit. This method can also be applied to the case where an EC material described later is dissolved in the electrolyte. A specific method for introducing an electrolyte into a cell unit may be a vacuum injection method, an atmospheric injection method, or a meniscus method. After an electrolyte is injected into the cell unit, the opening is sealed dropping and bonding method with no inlet can also be used.

(6) EC Material

An EC material for use in an EC element is an organic compound. Such an organic compound may be a low-molecular-weight organic compound or a high-molecular-weight organic compound that produces a color in response to an external electrical stimulus. A high-molecular-weight organic compound of this type may be a polymer containing a pyridinium salt, more specifically, a viologen polymer. An EC material can be a low-molecular-weight organic compound having a molecular weight of 2000 or less and can be a compound that changes from a bleached body to a colored body by an oxidation reaction or a reduction reaction on an electrode. An anodic EC material or a cathodic EC material must be used in an EC element.

The term "anodic EC material", as used herein, refers to a material that produces a color by an oxidation reaction in which an electron is removed from the material. In contrast, the term "cathodic EC material", as used herein, refers to a material that produces a color by a reduction reaction in which an electron is donated to the material.

Examples of the anodic EC material include, but are not limited to, thiophene derivatives, amines having an aromatic ring (for example, phenazine derivatives and triarylamine derivatives), pyrrole derivatives, thiazine derivatives, triarylmethane derivatives, bisphenylmethane derivatives, xanthene derivatives, fluorane derivatives, and spiropyran derivatives. In particular, low-molecular-weight thiophene derivatives (for example, monothiophene derivatives, oligothiophene derivatives, and thienoacene derivatives) and low-molecular-weight amines having an aromatic ring (for example, phenazine derivatives and triarylamine derivatives) can be used. This is because these molecules can be used as constituent materials of an electrochromic layer to provide an EC element having a desired absorption wavelength profile. These molecules in a neutral state have an absorption peak in an ultraviolet region, have no absorption in a visible light region, and have a bleached state having high permeability in the visible light region. These molecules become radical cations through an oxidation reaction, which shifts absorption to the visible light region, and thereby have a colored state. The absorption wavelength and the redox reaction potential of these molecules can be designed by increasing or decreasing the π conjugation length or by changing a substituent to alter the π conjugated system.

The term "low-molecular-weight", as used herein, preferably refers to a molecular weight of 2000 or less, more preferably a molecular weight of 1000 or less.

Specific examples of the cathodic EC material include, but are not limited to, pyridine compounds, such as viologen derivatives, and quinone compounds. The absorption wavelength and the redox reaction potential of these molecules can also be designed by increasing or decreasing the π conjugation length or by changing a substituent to alter the π conjugated system.

Multiple types of anodic EC materials and cathodic EC materials may be contained as EC materials. EC materials may be immobilized on the first electrode and/or the second electrode. This is because in an EC element according to the present disclosure, charge imbalance can be adjusted only by charge transfer between electrodes, and it is not necessary for the EC material to diffuse and reach the third electrode through an electrolyte. As a matter of course, the EC material may diffuse and reach the third electrode.

A specific method for immobilizing an EC material on an electrode (the first electrode or the second electrode) may be a method for bonding an EC material to an electrode material via a functional group of the molecules of the EC material, a method for holding an EC material integrally (for example, in a film state) by utilizing force such as electrostatic interaction, or a method for physically adsorbing an EC material on an electrode. In particular, in order to achieve rapid response of an EC element, a method for chemically bonding an EC material of a low-molecular-weight organic compound to a porous electrode via a functional group or a method for forming an EC material of a polymer on an electrode can be used. A specific example of the former method may be a method for immobilizing an EC material of a low-molecular-weight organic compound on an oxide fine particle electrode, such as titanium oxide, zinc oxide, or tin oxide, via a functional group, such as an acid group (for example, a phosphoric group or a carboxy group). A specific example of the latter method may be a method for forming a viologen polymer on a transparent electrode by polymerization. A method for forming a viologen polymer on a transparent electrode by polymerization may be electrolytic polymerization.

Such a method for immobilizing an EC material can be used to immobilize an oxidizable substance (or a reducible substance) on the third electrode.

8. Method for Driving EC Element

In an EC element, a third electrode is used to adjust the charge balance of the EC element. A method for driving an EC element includes a voltage control step of controlling the voltage between a first electrode and a third electrode, between a second electrode and a third electrode, or both on the basis of the charge balance state of the EC element detected.

A specific example of a method for driving an EC element will be described below. For example, consider the state that an anodic EC material in an EC element remains colored as an oxidant with a first electrode and a second electrode short-circuited for bleaching of the EC element. In other words, consider an anodic charge imbalance.

Application of a voltage between a third electrode and the first electrode and/or the second electrode such that the third electrode becomes a positive pole causes irreversible oxidization of an oxidizable substance in the third electrode. At the same time, reduction of an oxidant of an anodic EC material proceeds on the first electrode and/or the second electrode. Thus, charge rebalance can occur effectively.

Without the charge rebalance, in general, there can be an open circuit state between the third electrode and the first electrode and between the third electrode and the second electrode. This can prevent an electrode reaction in the third electrode from occurring without the intention of a charge rebalance. For a charge rebalance during bleaching, the third electrode and the first electrode, and/or the third electrode and the second electrode are connected to control the potential difference (voltage) between the electrodes. A charge rebalance may be performed at any time. An EC material in a colored state remaining after a sufficient period of bleaching action of an EC element is basically produced by charge imbalance. Thus, bleaching action in which a residual EC material in a colored state is bleached by a charge rebalance may be a typical example. An excessively large absolute value of the potential difference to be controlled may cause a degradation reaction of an EC material and an electrolyte. Thus, the absolute value is appropriately determined so as not to affect constitution elements of an EC element when the EC element is used. More specifically, the potential difference is determined such that an oxidation reaction of an oxidizable substance or a reduction reaction of a reducible substance proceeds in the third electrode and that an irreversible reaction of an EC material in an EC element is inhibited. For example, the potential difference V can be approximately $0 \leq V \leq 5$ V. Application of a high (absolute value of) voltage in a charge rebalance can advantageously promote an electrode reaction required for the charge rebalance. Application of a low (absolute value of) voltage in a charge rebalance can advantageously mitigate the adverse effects on an EC element and suppress an increase in power consumption of the EC element. The range of the (absolute value of) voltage applied in a charge rebalance can be appropriately determined by the characteristics and use environment of the element.

The voltage application time depends greatly on the voltage to be applied and can fundamentally be longer than the time during which an electric double layer is formed on an electrode surface and a Faraday current begins to flow but shorter than the time during which the charge balance exceeds the normal point and a residual color of a colored body of an EC material having opposite polarity is produced. More specifically, depending greatly on the response speed of an EC element, the voltage application time can be 1 ms or more and 10 s or less. After short voltage application, the application time and the voltage to be applied can be determined on the basis of the results. The voltage application pattern may be not only continuous application but also another patterned application, such as pulsed application.

The voltage polarity and the voltage can be determined on the basis of the charge balance state of an EC element. The detection of the charge balance state and the application of voltage will be described below.

In an EC element if necessary, the charge balance state may be detected, and on the basis of the information, the voltage between a third electrode and a first electrode and/or a second electrode may be controlled. For example, in the presence of both an anodic EC material and a cathodic EC material, either the anodic EC material or the cathodic EC material remains colored. In order to effectively bleach the residual colored EC material, a voltage depending on the polarity of charge balance must be applied to the third electrode and the first electrode and/or the second electrode. Application of a voltage having opposite polarity exacerbates charge imbalance, increases the amount of a colored body of an unbleached material, and exacerbates poor bleaching. Thus, it is important to detect the polarity of charge balance. Even with proper polarity, an excessive charge amount beyond charge imbalance can cause charge imbalance of opposite polarity. Thus, it is important to control the voltage and the charge amount on the basis of the detected charge balance state.

A technique of detecting the charge balance of an EC element may be a technique using the optical absorption of an EC material or a technique using electrode potential measurement. A specific technique using the optical absorption of an EC material can include comparison of optical absorption at an absorption wavelength characteristic of an anodic material and a cathodic material in an EC element. More specifically, light having an absorption wavelength characteristic of an anode material and a cathode material can be incident on an EC element, and light emitted from the EC element can be detected with a light-receiving element. A variation in absorbance with respect to the initial bleached state is determined at each absorption wavelength. A difference in variations indicates that an EC material having a greater variation is less bleached in proportional to the absorbance variation. Any light source and detector that have light intensity and sensitivity required for the detection and do not affect the characteristics of an EC element may be used for the detection. The light source may be a light-emitting diode (LED). The light-receiving element may be a photodiode. The light source, the detector, and a circuit configured to select a subsequent step from detection based on signals from the detector and the setting conditions may be provided for an EC apparatus including an EC element. The light source, detector, and circuit provided for an EC apparatus can perform the action truly reflective of the characteristics of the EC element even when the EC apparatus is replaced. If necessary, the light source, detector, and circuit may be provided for a component other than the EC apparatus. For example, when an EC apparatus is used in a window, the light source, detector, and circuit may be provided for the window frame. When an EC apparatus is used in a camera, the light source, detector, and circuit may be provided for the main body of the camera. This can expand the volume limits and improve the common availability of the circuit. Because of the limited number of components, the detection technique may be a method of inputting information (for example, pressing a button) based on user's visual inspection.

In a technique of detecting the charge balance of an EC element through electrode potential measurement, more specifically, the electric potential of a first electrode and/or a second electrode may be measured with a reference electrode. Specific examples will be described below. The following description is also applicable to residual coloring of a cathodic EC material if the polarity is reversed thus, as a representative example, residual coloring of an anodic EC material will be described below. In the following case, an anodic EC material remains colored, that is, part of the anodic EC material remains as an oxidant, due to charge imbalance even after an action of maximizing the permeability of an EC element, for example, a short circuit between a first electrode and a second electrode. Since a cathodic EC material in the EC element is substantially in a reduction state (bleached state), the electric potential of the first electrode and/or the second electrode is probably defined by the ratio of oxidant to reductant of the anodic EC material. A material used as an EC material generally has redox characteristics of high reversibility. This is because without reversibility, responsively and durability may be deteriorated, or power consumption may increase. Thus, the electric potential of the first electrode and/or the second electrode obeys the Nernst equation and slightly deviates from the standard electrode potential of the anodic EC material in proportion to the natural logarithm of the ratio of the concentration of oxidant to the concentration of reductant (to be precise, activity ratio). Utilizing this, the charge balance state can be detected. For example, when an anodic EC material and a cathodic EC material are dissolved in an electrolyte and can move freely, the charge balance state can depend on whether the electric potential of the first electrode and/or the second electrode is close to the redox potential of the anodic EC material or the cathodic EC material. For example, in the case where the electrode potential is close to the redox potential of the cathodic EC material, the charge balance can be judged to shift such that the cathodic EC material remains colored, and the degree of difference reflects the degree of charge imbalance. When the anodic EC material and the cathodic EC material are immobilized on the first electrode and the second electrode, the direction and degree of shift in the electric potential of the electrode on which the EC material is immobilized are measured with respect to the redox potential of the immobilized material. The polarity and degree of charge imbalance can be determined from the shift. An example will be described below. Assume that the electric potential of the electrode on which the cathodic EC material is immobilized is equal to the electric potential at which the cathodic EC material is substantially an oxidant (sufficiently positive with respect to the redox potential). At the same time, assume that the electric potential of the electrode on which the anodic EC material is immobilized is close to the redox potential of the anodic EC material such that an oxidant and a reductant of the anodic EC material coexist. In this case, the charge balance can be judged to shift such that the anodic EC material remains colored. In the same manner as in the optical detection, a circuit configured to select a subsequent step from the detection and setting conditions may be provided for an EC apparatus or a component other than the EC apparatus.

Figure 4:
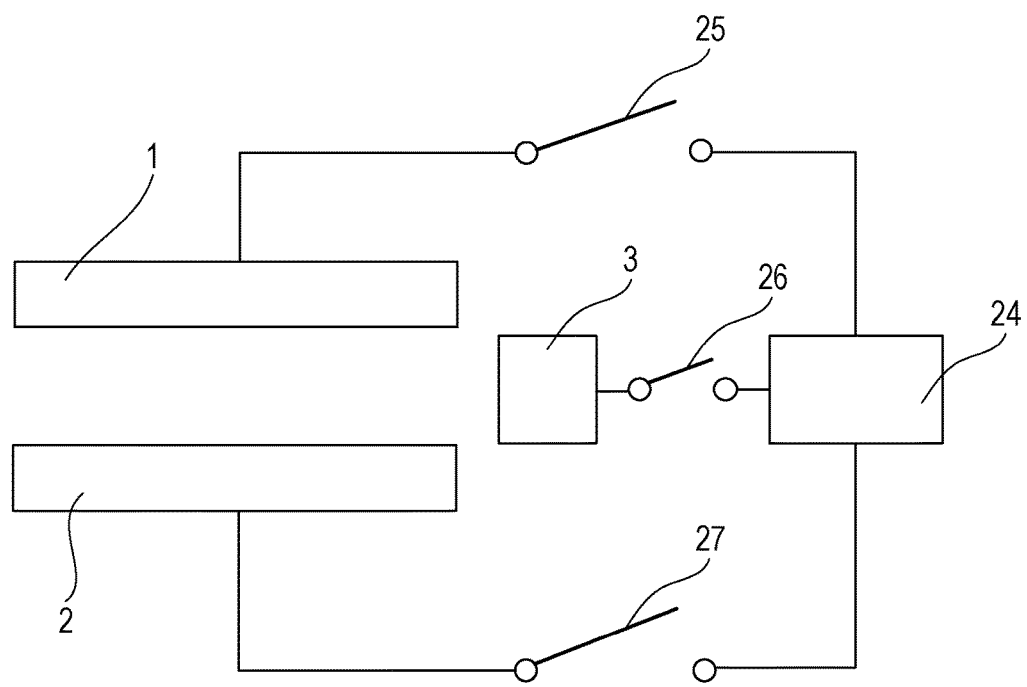
FIG. 4 is a schematic view of a control circuit of an EC element.

FIG. 4 is a schematic view of a control circuit of an EC element. The control circuit illustrated in FIG. 4 includes a variable voltage source 24 and switches 25, 26, and 27 between the variable voltage source 24 and electrodes. In normal driving, the switches 25 and 27 are turned on, and the switch 26 is turned off, to apply a voltage between a first electrode 1 and a second electrode 2. For a charge rebalance, one of the following (a) to (c) is selected.

(a) The switches 25 and 26 are turned on, and the switch 27 is turned off, to apply a voltage between the first electrode 1 and a third electrode 3.

(b) The switches 26 and 27 are turned on, and the switch 25 is turned off, to apply a voltage between the second electrode 2 and the third electrode 3.

(c) All the switches 25, 26, and 27 are turned on to apply a voltage between the first electrode 1, the second electrode 2, and the third electrode 3.

9. Advantages of Present Disclosure

An EC element includes a third electrode in addition to display electrodes (a first electrode and a second electrode). The third electrode contains an irreversibly oxidizable or reducible substance and can thereby reduce poor bleaching due to a charge imbalance of the EC element. As a typical example, a residual colored body of the EC material after an action to maximize the permeability of the EC element can be changed into a bleached body to improve the permeability of the EC element.

A measure to reduce poor bleaching due to charge imbalance may be a method using a redox buffer, as described in U.S. Pat. No. 6,188,505. However, as described in "Description of the Related Art", the method using a redox buffer does not truly correct a charge imbalance between display electrodes. It is therefore impossible to correct the ratio of the contribution of a colored body of the anodic EC material to the contribution of a colored body of the cathodic EC material in a spectrum of the colored EC element.

In contrast, in a technique according to the present disclosure, the third electrode containing an oxidizable substance or a reducible substance is used to adjust charge and rebalance a charge imbalance between the display electrodes. In other words, although the charge balance of the entire EC element does not change, a charge imbalance between display electrodes can be corrected at the sacrifice of an oxidizable substance (or a reducible substance) in the third electrode. In this case, because the EC material is colored only with the first electrode and the second electrode without the third electrode, the ratio of the contribution of an anode material to the contribution of a cathode material due to charge imbalance in a spectrum during coloring is not changed. Thus, the technique according to the present disclosure can be used to correct the spectrum of the colored EC element.

Figure 5A:
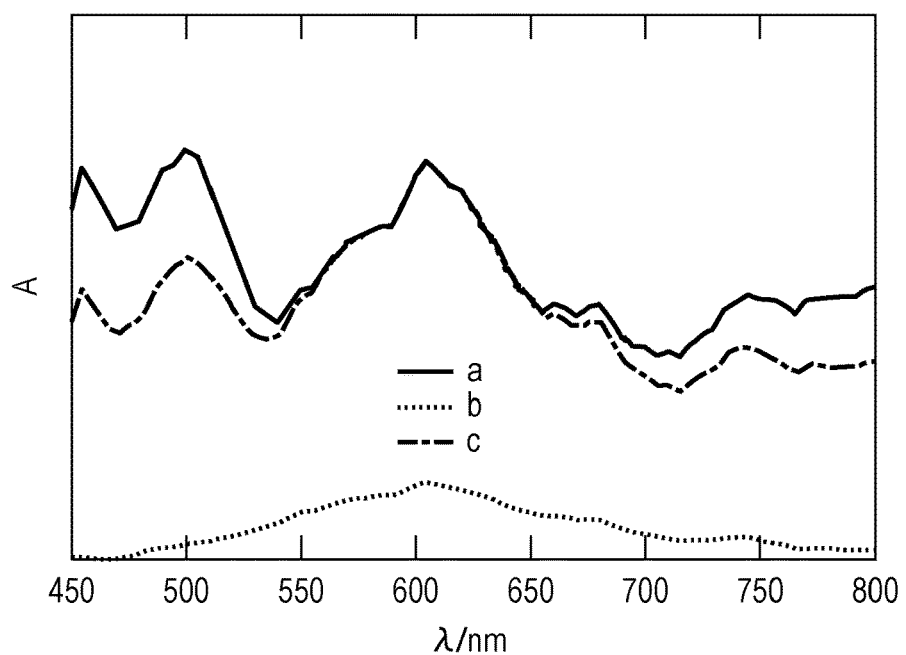
FIGS. 5A and 5B are absorption spectra of an EC element.
Figure 5B:
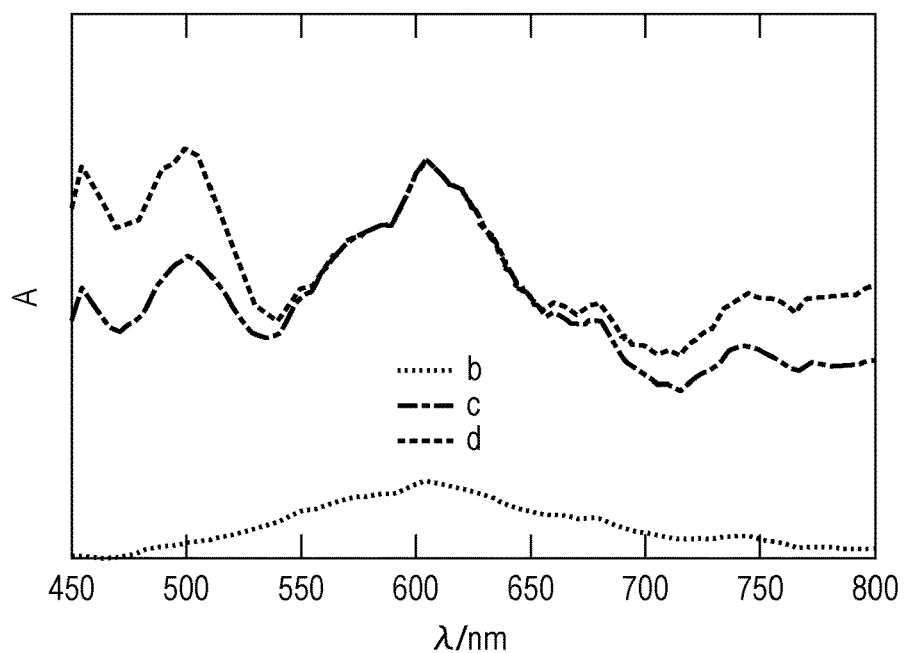

The accompanying drawings will be described below. FIGS. 5A and 5B are absorption spectra of an EC element. FIG. 5A shows absorption spectra of an EC element outside the scope of the present disclosure, and FIG. 5B shows absorption spectra of an EC element according to the present disclosure. FIGS. 5A and 5B show calculation examples of absorption spectra of an EC element containing an anodic EC material and a cathodic EC material (ordinate axis: absorbance, abscissa axis: wavelength). In the EC element, the anodic EC material has characteristic absorption peaks at 455 and 500 nm, and the cathodic EC material has a characteristic absorption peak at 605 nm. In the EC element with a normal charge balance, the EC element has an absorption spectrum a in FIG. 5A. When the charge balance of the EC element shifts such that a colored body of the cathodic EC material remains, the EC element has an absorption spectrum b in FIGS. 5A and 5B. In this case, the colored EC element has an absorption spectrum c in FIGS. 5A and 5B, in which the absorption of the anodic EC material (455 and 500 nm) is lower than the spectrum a of the normal charge balance. A change in a spectrum due to a change in charge balance cannot be corrected even with a redox buffer.

A third electrode containing an irreversibly reducible substance is used in this state. More specifically, the third electrode to be used contains a reducible substance that is not reduced by a first reductant of a cathodic organic EC compound but is more easily reducible than an oxidant in an irreversible reduction reaction of the cathodic organic EC compound. When the third electrode is used, a potential difference is applied between the third electrode and a first electrode and/or a second electrode such that the third electrode becomes negative. It is desirable that the potential difference to be applied be in a range in which a reducible substance in the third electrode is reduced but a cathodic organic EC compound in the third electrode does not undergo an irreversible reduction reaction. Consequently, a reducible substance in the third electrode is irreversibly reduced, and a cathode material remaining in a colored state on the first electrode and/or the second electrode is oxidized to reproduce an oxidant, which is a bleached body. Thus, in a technique according to the present disclosure, a charge imbalance can be rebalanced, and a spectrum of a normal charge balance can be held, as shown by a spectrum d in FIG. 5B. The spectrum d shown in FIG. 5B is very similar to the spectrum a shown in FIG. 5A, indicating that an EC element according to the present disclosure can hold a spectrum of the normal state.

Thus, when an EC element according to the present disclosure contains a cathodic EC material, the third electrode contains an irreversibly reducible substance. The reducible substance is not reduced by a first reductant of the cathodic EC material but is more easily reducible than an oxidant in an irreversible reduction reaction of the cathodic EC material. Thus, an EC element according to the present disclosure can hold a spectrum of the normal state. When an EC element according to the present disclosure contains an anodic EC material, the third electrode contains an oxidizable substance instead of the reducible substance, and the EC element has the same advantages only with the polarity being reversed.

Thus, a technique according to the present disclosure, that is, a technique using a third electrode containing an oxidizable substance or a reducible substance can solve the problems that cannot be solved even using a redox buffer as described in U.S. Pat. No. 6,188,505. More specifically, a technique according to the present disclosure can solve the problems of increased power consumption in the coloring action of common EC elements, a decreased response speed, and variations in the ratio of a colored body of an anodic EC material to a colored body of a cathodic EC material.

10. Use of EC Element

An EC element can be used as a constructional member, such as an optical filter, a lens unit, an image pick-up apparatus, or a window component.

Optical Filter

An optical filter includes an EC element and an active element electrically connected to the EC element. More specifically, the active element electrically connected to the EC element may be a transistor configured to control the permeability of the EC element. Examples of such a transistor include, but are not limited to, thin-film transistor (TFT) and metal insulator metal (MIM) elements. TFT, which is an abbreviation of a thin-film transistor, may be composed of a semiconductor or an oxide semiconductor.

Lens Unit

A lens unit includes an imaging optical system including a plurality of lenses and an optical filter including an EC element. The optical filter in the lens unit may be disposed between the lenses or outside the lenses. The lens unit can adjust with the optical filter the amount of light that is or has been transmitted through the imaging optical system.

Image Pick-Up Apparatus

An image pick-up apparatus includes an optical filter and an image pick-up element configured to receive light transmitted through the optical filter. The image pick-up element in the image pick-up apparatus is an element that receives light transmitted through the optical filter and is also referred to as a light-receiving element.

More specifically, the image pick-up apparatus may be a camera, a video camera, or a camera-equipped mobile phone. An imaging optical system can be mounted in and removed from the image pick-up apparatus. In other words, the main body including the image pick-up element can be separated from a lens unit including lenses.

When the main body of the image pick-up apparatus can be separated from a lens unit, an optical filter separated from the image pick-up apparatus can be used to take an image. In such a case, the optical filter can be disposed outside the lens unit, between the lens unit and the light-receiving element, or between lenses (in the case where the lens unit includes a plurality of lenses).

When an EC element according to the present disclosure is used as a constructional member of an image pick-up apparatus, the EC element may be disposed at any position. For example, the EC element may be disposed in front of an imaging optical system or just in front of the image pick-up element. For example, the EC element can be installed in the optical path of an imaging optical system coupled to the image pick-up element to control the amount or wavelength distribution characteristics of incident light in the image pick-up element. Such an imaging optical system may also be referred to as a lens system. Examples of the imaging optical system include, but are not limited to, a lens unit including a plurality of lenses.

When an EC element according to the present disclosure is used in an image pick-up apparatus, the EC element in the bleached state can have high permeability and allows a sufficient amount of incident light to pass through, and the EC element in the colored state can properly block and modulate incident light.

In the case where an image pick-up apparatus including a detachable lens unit includes an optical filter, the optical filter may be disposed between the lens unit and an image pick-up element.

In the case where an image pick-up apparatus includes an imaging optical system, an optical filter may be disposed between lenses or between a lens and an image pick-up element or may be disposed such that the imaging optical system is disposed between the optical filter and an image pick-up element.

When an EC element according to the present disclosure is used in an image pick-up apparatus, such as a camera, the EC element can decrease the light amount without reducing the gain of an image pick-up element.

FIG. 6 is a schematic view of an image pick-up apparatus according to an example embodiment. An image pick-up apparatus 100 illustrated in FIG. 6 includes a lens unit 102 and an image pick-up unit 103. The lens unit 102 is coupled to the image pick-up unit 103 via a mount (not shown) such that the lens unit 102 can be mounted on and removed from the image pick-up unit 103. The image pick-up unit 103 includes an optical filter 101.

In FIG. 6, the lens unit 102 includes a plurality of lenses or a lens unit and is a rear-focusing zoom lens, which performs focusing near an image pick-up element 110 rather than a diaphragm.

In FIG. 6, the lens unit 102 includes four lens units: from the object side, a first lens unit 104 having positive refractive power, a second lens unit 105 having negative refractive power, a third lens unit 106 having positive refractive power, and a fourth lens unit 107 having positive refractive power. In FIG. 6, an aperture stop 108 is disposed between the second lens unit 105 and the third lens unit 106. The image pick-up apparatus 100 illustrated in FIG. 6 performs zooming by, changing the spacing between the second lens unit 105 and the third lens unit 106 and performs focusing by moving part of the fourth lens unit 107. In FIG. 6, the lens unit 102 includes the aperture stop 108 between the second lens unit 105 and the third lens unit 106. The components are arranged such that light transmitted through the lens unit 102 passes through the lens units (104 to 107), the aperture stop 108, and the optical filter 101 and is received by the image pick-up element 110. The amount of light received by the image pick-up element 110 can be adjusted with the aperture stop 108 and the optical filter 101. In FIG. 6, the image pick-up unit 103 includes a glass block 109 and the image pick-up element 110. The optical filter 101 is disposed between the glass block 109 and the image pick-up element 110.

More specifically, the glass block 109 may be a low-pass filter, a faceplate, or a color filter.

The image pick-up element 110 is a sensor that receives light transmitted through the lens unit 102 and may be a CCD or CMOS. The image pick-up element 110 may be a photosensor, such as a photodiode, and may be an element that acquires and outputs information on the intensity or wavelength of light.

In FIG. 6, the image pick-up unit 103 includes the optical filter 101 between the glass block 109 and the image pick-up element 110. In the image pick-up apparatus, the optical filter 101 may have any position and may be disposed between the third lens unit 106 and the fourth lens unit 107 or outside the lens unit 102, for example.

When disposed in a convergence region, the optical filter 101 can advantageously have a small area. In the image pick-up apparatus 100 illustrated in FIG. 6, the lens unit 102 may be of any type, such as a rear-focusing type or an inner focusing type. The inner focusing type performs focusing in front of the diaphragm. The lens unit 102 may include a special lens, such as a fish-eye lens or a macro lens, as well as a zoom lens.

Such an image pick-up apparatus may be a product including a light amount control element and an image pick-up element in combination and may be an image pick-up apparatus in a camera, a digital camera, a video camera, a digital video camera, a mobile phone, a smartphone, a personal computer (PC), or a tablet, for example.

Window Component

A window component includes a pair of transparent substrates, an EC element disposed between the transparent substrates, and an active element configured to control the permeability of the EC element. The active element is coupled directly or indirectly to the EC element. The window component can adjust the amount of light transmitted through a transparent substrate with the EC element. The window component, together with another component such as a window frame, can be used as a window. A window component can be used in windows of aircrafts, automobiles, and houses. A window component including an EC element can be referred to as a window component having an electronic curtain.

Figure 7A:
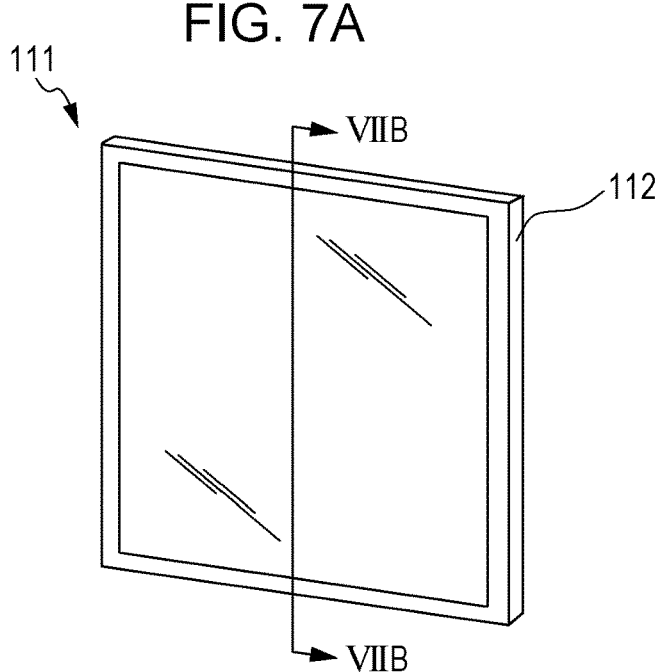
FIGS. 7A and 7B are schematic views of a window component according to an example embodiment.
Figure 7B:
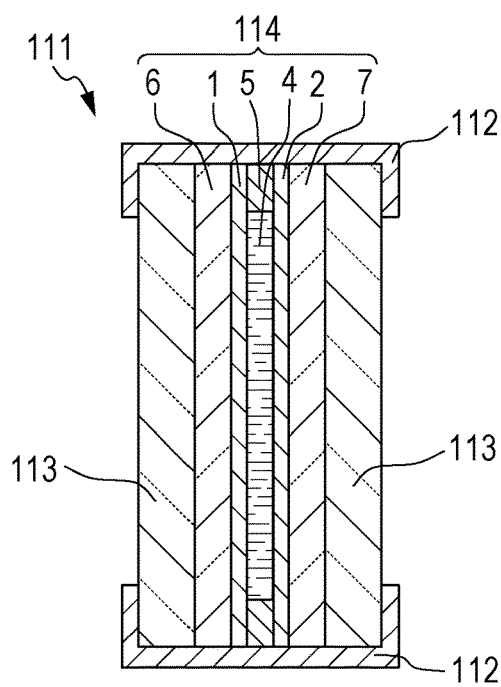

FIGS. 7A and 7B are schematic views of a window component according to an example embodiment. FIG. 7A is a perspective view, and FIG. 7B is a VIIB-VIIB cross-sectional view of FIG. 7A. A window component 111 illustrated in FIGS. 7A and 7B is a photochromic window and includes an EC element 114 (a third electrode 3 is not shown), transparent sheets 113 holding the EC element 114 therebetween, and a frame 112 that surrounds and integrates the whole body drive unit of the window component 111 illustrated in FIGS. 7A and 7B may be integrated into the frame 112 or may be coupled to the EC element 114 through a line disposed outside the frame 112.

In the window component 111 illustrated in FIGS. 7A and 7B, the transparent sheets 113 may be formed of any material having high light transmittance and can be formed of a glass material in consideration of the use as a window. In FIGS. 7A and 7B, although the EC element 114 is a constructional member independent of the transparent sheets 113, for example, substrates 6 and 7 of the EC element 114 may be considered to be the transparent sheets 113.

In the window component 111 illustrated in FIGS. 7A and 7B, the frame 112 may be formed of any material and may be any member that surrounds and integrates at least part of the EC element 114.

EXAMPLES

Although the present disclosure will be to specifically described in the following exemplary embodiments, the present invention is not limited to these exemplary embodiments.

[Synthesis Example 1] Synthesis of Compound 1

A cathodic EC material, a compound 1, was synthesized in accordance with the literature of Cinnsealach et al. (Solar Energy Materials and Solar Cells, 57, pp. 107-125 (1999)).

[Chem. 1]

Compound 1

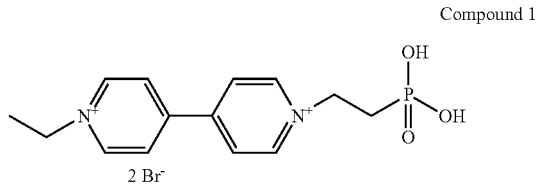

Exemplary Embodiment 1

Fabrication of EC Element

Figure 8A:
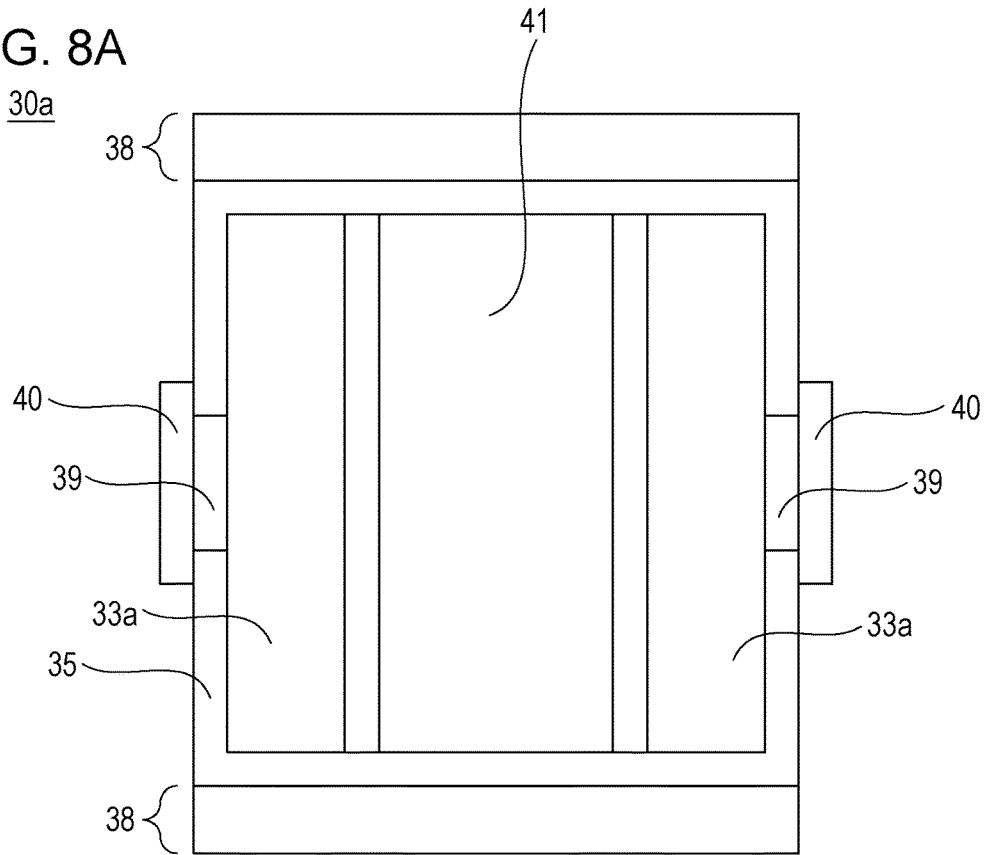
FIGS. 8A and 8B are schematic views of an EC element fabricated in Exemplary Embodiment 1.
Figure 8B:
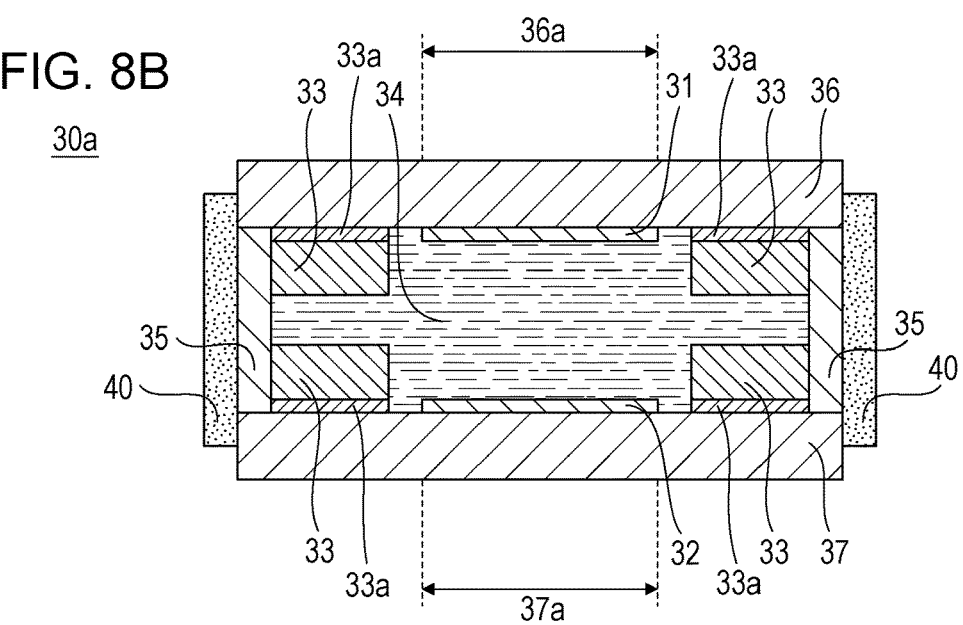

An EC element 30a illustrated in FIGS. 8A and 8B was fabricated by the following process.

(1) Preparation of Transparent Electroconductive Glass

First, two transparent electroconductive glass sheets on which a fluorine-doped tin oxide (FTO) film is formed (TEC15, manufactured by Nippon Sheet Glass Co., Ltd.) were prepared.

(2) Fabrication of Substrate

The FTO film on the transparent electroconductive glass sheets was partly removed with a diamond tool and was divided into three portions. More specifically, the FTO film was divided into a central FTO film 41 and an FTO film 33a disposed on each side of the FTO film 41. The FTO film 41 functioned as a first electrode 31 or a second electrode 32. A third electrode 33 was formed on the FTO film 33a and was electrically independent of the first electrode 31 or the second electrode 32.

(3) Fabrication of Third Electrode

A mixture of 12 g of Antimony-doped tin oxide nano-particles (manufactured by Ishihara Sangyo Kaisha, Ltd.), 2 mL of concentrated nitric acid, and 200 mL of water was stirred at 80° C. for 8 hours and was dried under vacuum for one day to produce a tin oxide nano-particle cake. Then, 4 g of the cake was mixed with 20 mL of water, 1.2 g of polyethyleneglycol, and 0.4 g of hydroxypropylcellulose for 15 days to prepare a slurry. The slurry was applied to the FTO films 33a in the regions in which the third electrode 33 was to be formed and was fired at 500° C. for 30 minutes to form an antimony-doped tin oxide nano-particle film (hereinafter also referred to as a "nano-particle film"). The nano-particle film had a specific surface area of 450 $cm^2/cm^2$.

A 10 mM solution of 4-aminosalicylic acid in ethanol was applied to the nano-particle film and was left standing overnight. The nano-particle film was washed with ethanol and was dried. Thus, the third electrode 33 containing 4-aminosalicylic acid immobilized on the nano-particle film was fabricated.

(4) Adhesion of Substrates

A UV-curable adhesive (TB3035B, manufactured by ThreeBond Co., Ltd.) containing 100-μm spacer beads was applied as a sealant 35 to the periphery of the two transparent electroconductive glass sheets on which the third electrode 33 was formed except an inlet 39. The two transparent electroconductive glass sheets were superposed such that the first electrode 31 and the second electrode 32 faced each other, the third electrodes 33 faced each other, and an electrode lead portion 38 was exposed. While the third electrodes 33 were masked so as not to be exposed to UV light, the adhesive was cured by UV irradiation. Thus, a substrate 36 and a substrate 37 were bonded together.

(5) Injection of Electrolyte Solution

The following materials were mixed to prepare an electrolyte solution.

Anodic organic EC compound: 5,10-dimethyl-5,10-dihydrophenazine (hereinafter also referred to as DMDHP)

Cathodic organic EC compound: ethyl viologen hexafluorophosphate (hereinafter also referred to as EV)

0.1 M solution of tetrabutylammonium hexafluorophosphate in propylene carbonate (PC)

The concentration of each of the organic EC compounds (the anodic organic EC compound and the cathodic organic EC compound) in the electrolyte solution was 20 mM. The electrolyte solution (electrolyte 34) was then injected through the inlet 39, and the inlet 39 was sealed (40) with the UV-curable adhesive described in (4). Thus, the EC element 30a was completed.

Measurement of Redox Potential

The organic EC compounds and the oxidizable substance in the present exemplary embodiment were evaluated with respect to susceptibility to oxidation. The specific method will be described below.

1 mM of the EC material (DMDHP, EV) and 1 mM of the oxidizable substance (4-aminosalicylic acid) were dissolved in a 0.1 M solution of tetrabutylammonium hexafluorophosphate in propylene carbonate (PC) to prepare a solution. A cyclic voltammogram (CV) measurement was performed using FTO as a working electrode, platinum as a counter electrode, and $Ag/Ag^+$ ($PF_6$, PC) as a reference electrode. As a result, the half-wave potential of a redox reaction corresponding to a first oxidation reaction of DMDHP was −0.62 V, and the oxidation potential of an irreversible oxidation reaction of DMDHP was 1.35 V. The half-wave potential of a redox reaction corresponding to a first reduction reaction of EV was −1.24 V, and the reduction potential of an irreversible reduction reaction of EV was −2.60 V. The oxidation potential of an irreversible oxidation reaction of the oxidizable substance 4-aminosalicylic acid was −0.20 V.

The results showed that in the present exemplary embodiment, the oxidizable substance 4-aminosalicylic acid was not oxidized by a first oxidant of the anodic organic EC compound and was more easily oxidizable than a reductant in the irreversible oxidation reaction of the anodic organic EC compound. The results also showed that the oxidation potential of the oxidizable substance was between the oxidation potential of the first oxidation reaction of the anodic organic EC compound and the oxidation potential of the irreversible oxidation reaction of the anodic organic EC compound.

installation of Charge Balance State Detecting Unit

Two LEDs and a photodiode were used to install a charge balance state detecting unit in the EC element fabricated in the present exemplary embodiment. More specifically, first, an LED having a light emission wavelength of 460 nm and an LED having a light emission wavelength of 595 nm were placed on the substrate 36 opposite the first electrode 31. The two LEDs were placed in a region 36a in FIG. 8B, which corresponded to the installation region of the first electrode 31. The wavelength of 460 nm corresponds to an absorption wavelength of the anodic organic EC compound, and the wavelength of 595 nm corresponds to an absorption wavelength of the cathodic organic EC compound. The photodiode was then placed on the substrate 37 opposite the second electrode 32. The photodiode was placed in a region 37a in FIG. 8B, which corresponded to the installation region of the second electrode 32. The photodiode was used to determine the absorbance ratio of the wavelengths 460 and 595 nm.

Endurance Driving of EC Element

A voltage of 0.8 V was applied between the first electrode 31 and the second electrode 32 in the EC element 30a to achieve a colored state. After the colored state was held for one week, the first electrode 31 and the second electrode 32 were short-circuited for bleaching. The variation in absorbance with respect to the initial bleached state at a wavelength of 460 nm was +0.10. The variation in absorbance with respect to the initial bleached state at a wavelength of 595 nm was ±0.00. The results demonstrated the presence of a residual colored body of the anodic organic EC compound having art absorption peak at a wavelength of 455 nm, thus showing poor bleaching of the EC element.

Reduction of Poor Bleaching

In the EC element after the endurance driving, a voltage was applied between the first electrode 31 and the third electrode 33 while the first electrode 31 and the second electrode 32 were short-circuited. The application time was 10 ms. The EC element was operated in the following sequence.

(i) Apply a voltage of 1.8 V to the third electrode 33 serving as a positive pole and the first electrode 31 serving as a negative pole. Compare the absorbance before the voltage application with the absorbance obtained 5 seconds after the voltage application.

(ii) Apply a voltage again if the variation in absorbance with respect to the initial bleached state at a wavelength of 460 nm is not 0.005 or less, or otherwise complete voltage application.

(iii) Complete voltage application when the variation in absorbance with respect to the initial bleached state at a wavelength of 595 nm reaches 0.005 or more.

As a result, voltage application was completed according to (ii) approximately 5 minutes after drive start, and poor bleaching with a residual colored body of the anodic organic EC compound was reduced to ⅒ or less. Visual inspection of the EC element after the treatment showed that poor bleaching was uniformly reduced and almost disappeared.

These results confirmed the following advantages (I) to (III).

(I) In an EC element including an anodic organic EC compound and a cathodic organic EC compound, a charge rebalance with a third electrode containing an oxidizable substance that satisfies the following conditions (Ia) and (Ib) can reduce poor bleaching.

(Ia) The oxidizable substance is not oxidized by a first oxidant of the anodic organic EC compound but is more easily oxidizable than a reductant in an irreversible oxidation reaction of the anodic organic EC compound.

(Ib) The oxidation potential of an irreversible oxidation reaction of the oxidizable substance is between the oxidation potential of a reversible first oxidation reaction of the anodic organic EC compound and the oxidation potential of an irreversible oxidation reaction of the organic EC compound.

(II) The third electrode 33 disposed outside the optical path of light transmitted through the first electrode 31 or the second electrode 32 can increase light transmittance.

(III) The two third electrodes 33 disposed adjacent to each of the first electrode 31 and the second electrode 32 enable uniform bleaching.

A unit configured to detect the charge balance state of an EC element that utilized the optical absorption of an organic EC compound was installed, and a voltage applied to the first electrode 31 and/or the second electrode 32 and the third electrode 33 was controlled on the basis of the detected charge balance state. This enabled effective bleaching.

Exemplary Embodiment 2

Fabrication of EC Element

Figure 9A:
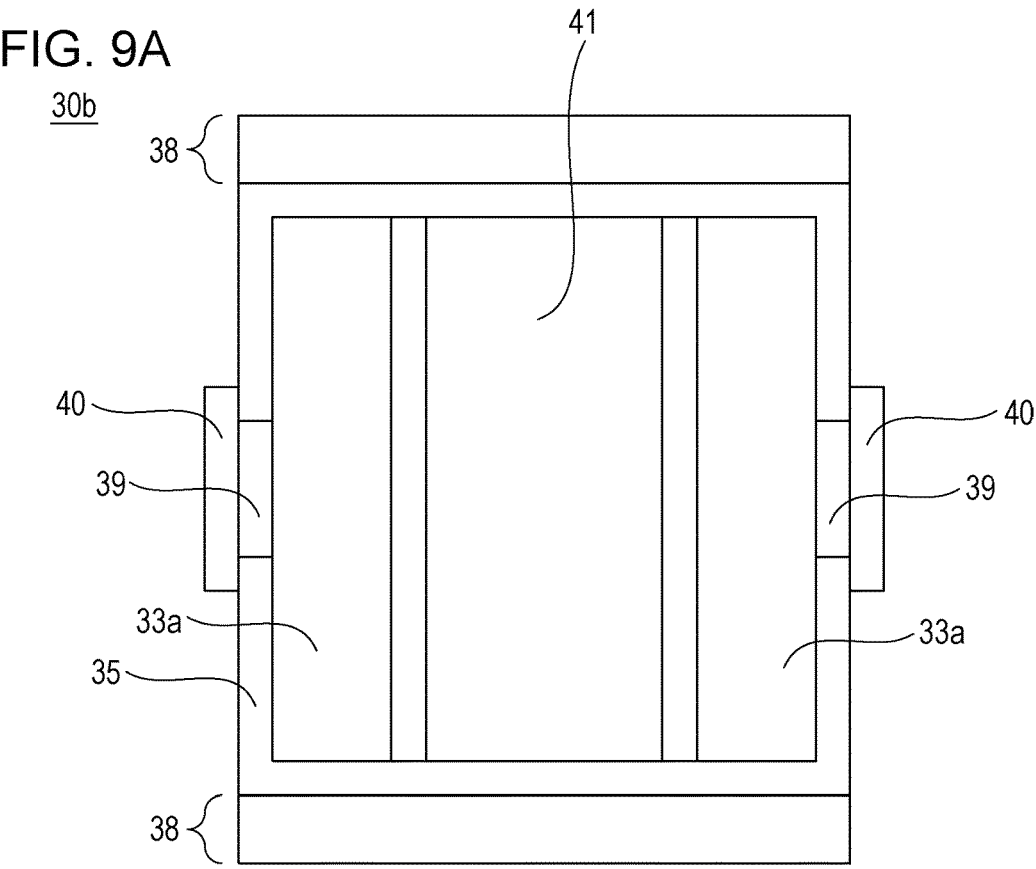
FIGS. 9A and 9B are schematic views of an EC element fabricated in Exemplary Embodiment 2.
Figure 9B:
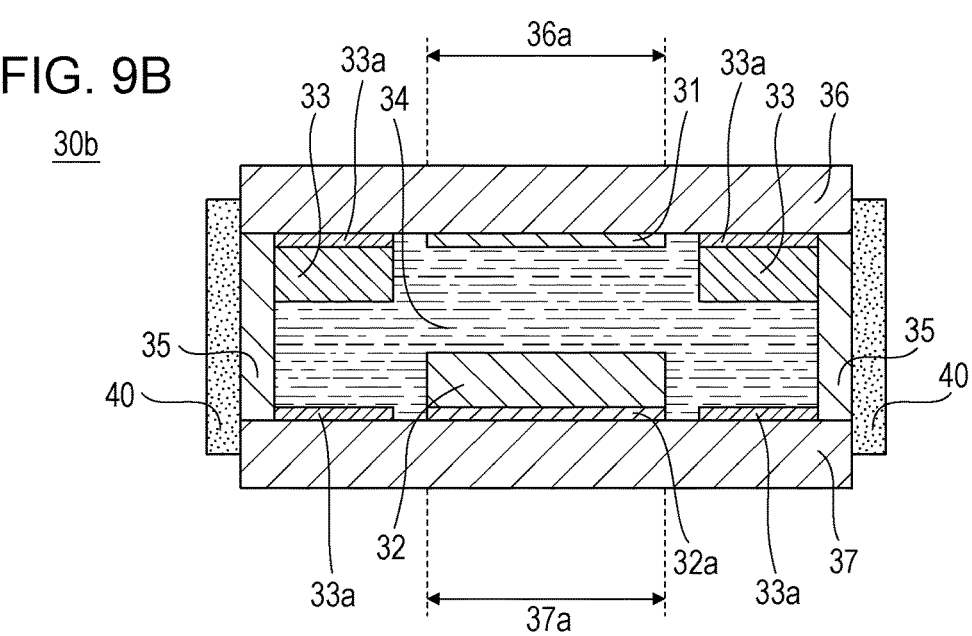

An EC element 30b illustrated in FIGS. 9A and 9B was fabricated by the following process.

(1) Preparation of Transparent Electroconductive Glass

First, the two transparent electroconductive glass sheets used in Exemplary Embodiment 1 on which a fluorine-doped tin oxide (FTO) film is formed (TEC15, manufactured by Nippon Sheet Glass Co., Ltd.) were prepared.

(2) Fabrication of Substrate

The transparent electroconductive glass sheets were processed by the method described in (2) of Exemplary Embodiment 1 to fabricate substrates with an electrode.

(3) Fabrication of Second Electrode and Third Electrode

In one of the substrates with an electrode (a substrate 37) on which a second electrode 32 was to be formed, a titanium oxide nano-paste (Nanoxide-HT, manufactured by Solaronix SA) was applied to an FTO film 32a in the region in which the second electrode 32 was to be formed. The titanium oxide nano-paste was fired at 500° C. for 30 minutes to form the second electrode 32. The resulting nano-particle film (the second electrode 32) had a specific surface area of 300 $cm^2/cm^2$. The second electrode 32 was then immersed overnight in a 5 mM aqueous solution of a compound 1, which was a cathodic EC material, was washed with water, and was dried to form the second electrode 32 on which the cathodic EC material was immobilized.

A third electrode 33 was formed by the method described in (3) of Exemplary Embodiment 1 on the other transparent electroconductive glass sheet on which a first electrode 31 was formed.

(4) Adhesion of Substrates

A substrate 36 and the substrate 37 were bonded together by the method described in (4) of Exemplary Embodiment 1. More specifically, a UV-curable adhesive (TB3035B, manufactured by ThreeBond Co., Ltd.) containing 100-μm spacer beads was applied to the periphery of the substrate 36 and the substrate 37 except an inlet 39. The substrate 36 and the substrate 37 were bonded together such that the first electrode 31 and the second electrode 32 faced each other.

(5) Injection of Electrolyte Solution

First, an anodic EC material DMDHP was dissolved in a 0.1 M solution of lithium hexafluorophosphate in propylene carbonate (PC) to prepare an electrolyte solution. The concentration of the EC material in the electrolyte solution was 20 mM. The electrolyte solution was then injected through the inlet 39, and the inlet 39 was sealed (40) with the UV-curable adhesive described in (4) of Exemplary Embodiment 1. Thus, the EC element 30b was completed. The EC element 30b was provided with a charge balance state detecting unit in the same manner as in Exemplary Embodiment 1.

Endurance Driving of EC Element

A voltage of 0.7 V was applied between the first electrode 31 and the second electrode 32 in the EC element 30b to achieve a colored state. After the colored state was held for one week, the first electrode 31 and the second electrode 32 were short-circuited for bleaching. The variation in absorbance with respect to the initial bleached state at a wavelength of 460 nm was +0.15. The variation in absorbance with respect to the initial bleached state at a wavelength of 595 nm was ±0.00. The results demonstrated the presence of a residual colored body of the anodic organic EC compound having an absorption peak at a wavelength of 455 nm, thus showing poor bleaching of the EC element.

Reduction of Poor Bleaching

In the EC element after the endurance driving, a voltage was applied between the first electrode 31 and the third electrode 33. The application time was 10 ms. The EC element was operated in the following sequence (i) to (iii).

(i) Apply a voltage of 1.7 V to the third electrode 33 serving as a positive pole and the first electrode 31 serving as a negative pole. Compare the absorbance before the voltage application with the absorbance obtained 5 seconds after the voltage application.

(ii) Apply a voltage again if the variation in absorbance with respect to the initial bleached state at a wavelength of 460 nm is not 0.005 or less, or otherwise complete voltage application.

(iii) Complete voltage application when the variation in absorbance with respect to the initial bleached state at a wavelength of 595 nm reaches 0.005 or more.

As a result, voltage application was completed according to (ii) approximately 8 minutes after drive start, and poor bleaching with a residual colored body of the anodic organic EC compound was reduced to 1/10 or less. Visual inspection of the EC element after the treatment showed that poor bleaching was uniformly reduced and almost disappeared.

These results confirmed the following advantages (I) to (IV).

(I) In an EC element including an anodic organic EC compound and a cathodic organic EC compound, a charge rebalance with a third electrode containing an oxidizable substance that satisfies the following conditions (Ia) and (Ib) can reduce poor bleaching.

(Ia) The oxidizable substance is not oxidized by a first oxidant of the anodic organic EC compound but is more easily oxidizable than a reductant in an irreversible oxidation reaction of the anodic organic EC compound.

(Ib) The oxidation potential of an irreversible oxidation reaction of the oxidizable substance is between the oxidation potential of a reversible first oxidation reaction of the anodic organic EC compound and the oxidation potential of an irreversible oxidation reaction of the anodic organic EC compound.

(II) The third electrode 33 disposed outside the optical path of light transmitted through the first electrode 31 or the second electrode 32 can increase light transmittance.

(III) Even when one of organic EC compounds is immobilized on an electrode (the second electrode 32), a charge rebalance with the third electrode 33 containing an oxidizable substance can reduce poor bleaching.

(IV) The two third electrodes 33 disposed adjacent to the first electrode 31 (or the second electrode 32) enable uniform bleaching.

A unit configured to detect the charge balance state of an EC element that utilized the optical absorption of an organic EC compound was installed, and a voltage applied to the first electrode 31, the second electrode 32, and the third electrode 33 was controlled on the basis of the detected charge balance state. This enabled effective bleaching.

Exemplary Embodiment 3

Fabrication of EC Element
An EC element was fabricated by the following process.
(1) Preparation of Transparent Electroconductive Glass Sheet,
(2) Fabrication of Substrate
Substrates with an electrode were fabricated by the method described in (1) and (2) of Exemplary Embodiment 1.
(3) Fabrication of Third Electrode
A 1 mM solution of bis(2-(3,4-dimethyl-5-(4-carboxylic acid phenyl)thiophene) (hereinafter sometimes abbreviated to BDMCPT) in ethanol was applied to a nano-particle film formed by the process described in (3) of Exemplary Embodiment 1 and was left standing overnight. The nano-particle film was washed with ethanol and was dried. Thus, a third electrode 33 containing BDMCPT immobilized on the nano-particle film was fabricated.

(4) Adhesion of Substrates, Injection of Electrolyte Solution
Substrates with an electrode were fabricated by the method described in (4) and (5) of Exemplary Embodiment 1.
Measurement of Redox Potential
The organic EC compounds and the oxidizable substance in the present exemplary embodiment were evaluated with respect to susceptibility to oxidation. The specific method will be described below.
1 mM of the EC material (DMDHP, EV) and 1 mM of the oxidizable substance (BDMCPT) were dissolved in a solution of 0.1 M tetrabutylammonium hexafluorophosphate in propylene carbonate (PC) to prepare a solution. A cyclic voltammogram (CV) measurement was performed using FTO as a working electrode, platinum as a counter electrode, and $Ag/Ag^+$ ($PF_6$, PC) as a reference electrode. As a result, the half-wave potential of a redox reaction corresponding to a first oxidation reaction of DMDHP was −0.62 V, and the oxidation potential of an irreversible oxidation reaction of DMDHP was 1.35 V. The half-wave potential of a redox reaction corresponding to a first reduction reaction of EV was −1.24 V, and the reduction potential of an irreversible reduction reaction of EV was −2.60 V. The oxidation potential of an irreversible oxidation reaction of the oxidizable substance BDMCPT was 0.33 V.

The results showed that in the present exemplary embodiment, the oxidizable substance BDMCPT was not oxidized by a first oxidant of the anodic organic EC compound and was more easily oxidizable than a reductant in the irreversible oxidation reaction of the anodic organic EC compound. The results also showed that the oxidation potential of the oxidizable substance was between the oxidation potential of the first oxidation reaction of the anodic organic EC compound and the oxidation potential of the irreversible oxidation reaction of the anodic organic EC compound.

Installation of Charge Balance State Detecting Unit
A charge balance state detecting unit was installed by the method described in Exemplary Embodiment 1.
Endurance Driving of EC Element
Endurance driving of the EC element was performed by the method described in Exemplary Embodiment 1. As a result, the variation in absorbance with respect to the initial bleached state at a wavelength of 460 nm was +0.12. The variation in absorbance with respect to the initial bleached state at a wavelength of 595 nm was ±0.00. The results demonstrated the presence of a residual colored body of the anodic organic EC compound having an absorption peak at a wavelength of 455 nm, thus showing poor bleaching of the EC element.
Reduction of Poor Bleaching
Poor bleaching was reduced by the method described in Exemplary Embodiment 1. As a result, voltage application was completed according to (ii) approximately 8 minutes after drive start, and poor bleaching with a residual colored body of the anodic organic EC compound was reduced to 1/10 or less. Visual inspection of the EC element after the treatment showed that poor bleaching was uniformly reduced and almost disappeared.

These results confirmed the following advantages (I) to (III).

(I) In an EC element including an anodic organic EC compound and a cathodic organic EC compound, a charge rebalance with a third electrode containing an oxidizable substance that satisfies the following conditions (Ia) and (Ib) can reduce poor bleaching.

(Ia) The oxidizable substance is not oxidized by a first oxidant of the anodic organic EC compound but is more easily oxidizable than a reductant in an irreversible oxidation reaction of the anodic organic EC compound.

(Ib) The oxidation potential of an irreversible oxidation reaction of the oxidizable substance is between the oxidation potential of a reversible first oxidation reaction of the anodic organic EC compound and the oxidation potential of an irreversible oxidation reaction of the organic EC compound.

(II) A third electrode disposed outside the optical path of light transmitted through a first electrode or a second electrode can increase light transmittance.

(III) Two third electrodes disposed adjacent to each of a first electrode and a second electrode enable uniform bleaching.

The present disclosure can provide an electrochromic element that can correct a charge imbalance, reduce poor bleaching (residual coloring), and reproduce a spectrum during coloring action.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-027751 filed Feb. 17, 2016 and No. 2017-006481 filed Jan. 18, 2017, which are hereby incorporated by reference herein in their entirety.

What is claimed is:

1. An electrochromic element comprising:
a first electrode;
a second electrode; and
a third electrode, wherein:
at least one of the first electrode and the second electrode is a transparent electrode, and an electrolyte, an anodic organic electrochromic compound, and a cathodic redox substance are present between the first electrode and the second electrode,
the third electrode is electrically connectable to the first electrode or the second electrode via the electrolyte,
the third electrode contains an irreversible oxidation substance, and
an oxidation potential C of the irreversible oxidation substance is between an oxidation potential A of a reversible first oxidation reaction of the anodic organic electrochromic compound and an oxidation potential B of an irreversible oxidation reaction of the anodic organic electrochromic compound.

2. The electrochromic element according to claim 1, wherein:
the cathodic redox substance is a cathodic organic electrochromic compound,
the third electrode further contains an irreversible reduction substance, and
a reduction potential F of the irreversible reduction substance is between a reduction potential D of a reversible first reduction reaction of the cathodic organic electrochromic compound and a reduction potential E of an irreversible reduction reaction of the cathodic organic electrochromic compound.

3. The electrochromic element according to claim 1, wherein:
the cathodic redox substance is a cathodic organic electrochromic compound,
the third electrode further contains an irreversible reduction substance, and
a reduction potential F of the irreversible reduction substance is between a reduction potential D of a reversible first reduction reaction of the cathodic organic electrochromic compound and a reduction potential E of an irreversible reduction reaction of the cathodic organic electrochromic compound.

4. The electrochromic element according to claim 3, further comprising at least one additional electrode having a composition that is the same as the third electrode.

5. The electrochromic element according to claim 3, further comprising a unit configured to detect a charge balance state of the electrochromic element.

6. The electrochromic element according to claim 1, wherein the third electrode is disposed outside an optical path of light transmitted through the first electrode or the second electrode.

7. The electrochromic element according to claim 1, wherein at least one of the organic electrochromic compounds is immobilized on the first electrode or the second electrode.

8. The electrochromic element according to claim 1, wherein the third electrode is disposed on at least a portion around the first electrode or the second electrode.

9. The electrochromic element according to claim 1, further comprising at least one additional electrode having a composition that is the same as the third electrode.

10. The electrochromic element according to claim 1, further comprising a unit configured to control a potential difference between the first electrode or the second electrode and the third electrode.

11. The electrochromic element according to claim 1, further comprising a unit configured to detect a charge balance state of the electrochromic element.

12. The electrochromic element according to claim 11, wherein the unit configured to detect a charge balance state by utilizing optical absorption of the organic electrochromic material.

13. An optical filter comprising:
the electrochromic element according to claim 1; and
an active element to be coupled to the electrochromic element.

14. A lens unit comprising:
an imaging optical system including a plurality of lenses; and
the optical filter according to claim 13.

15. An image pick-up apparatus comprising:
an imaging optical system including a plurality of lenses;
the optical filter according to claim 13; and
an image pick-up element configured to receive light transmitted through the optical filter.

16. The image pick-up apparatus according to claim 15, wherein the imaging optical system can be mounted in and removed from the image pick-up apparatus.

17. A window component comprising:
a pair of transparent substrates;
the electrochromic element according to claim 1 disposed between the pair of transparent substrates; and
an active element to be coupled to the electrochromic element.

18. An electrochromic element comprising:
a first electrode;
a second electrode; and
a third electrode, wherein:
at least one of the first electrode and the second electrode is a transparent electrode, and an electrolyte, a cathodic organic electrochromic compound, and an anodic redox substance are present between the first electrode and the second electrode,
the third electrode is electrically connectable to the first electrode or the second electrode via the electrolyte, the third electrode contains an irreversible reduction substance, and a reduction potential F of the irreversible reduction substance is between a reduction potential D of a reversible first reduction reaction of the cathodic organic electrochromic compound and a reduction potential E of an irreversible reduction reaction of the cathodic organic electrochromic compound.

* * * * *